United States Patent
Mandal et al.

(10) Patent No.: US 7,043,738 B2
(45) Date of Patent: May 9, 2006

(54) METHOD AND APPARATUS FOR MANAGING A DATA IMAGING SYSTEM USING CIM PROVIDERS IN A DISTRIBUTED COMPUTER SYSTEM

(75) Inventors: Chhandomay Mandal, Nashua, NH (US); Jillian I. DaCosta, Nashua, NH (US); Lanshan Cao, Andover, MA (US); Jonathan C. France, Somerville, MA (US); Yuantai Du, Nashua, NH (US); Roberta A. Pokigo, Billerica, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 792 days.

(21) Appl. No.: 10/092,070

(22) Filed: Mar. 5, 2002

(65) Prior Publication Data

US 2003/0172088 A1 Sep. 11, 2003

(51) Int. Cl.
*G06F 9/46* (2006.01)
(52) U.S. Cl. ............. 719/328; 707/204; 711/162
(58) Field of Classification Search ........ 719/325–328; 707/1–10, 100–104.1, 200–205; 711/154–166
See application file for complete search history.

(56) References Cited

U.S. PATENT DOCUMENTS

| | | | |
|---|---|---|---|
| 6,253,295 B1 * | 6/2001 | Beal et al. ................. | 711/162 |
| 6,643,671 B1 * | 11/2003 | Milillo et al. ............. | 707/204 |
| 6,775,700 B1 * | 8/2004 | Cheng et al. ............. | 709/225 |

* cited by examiner

*Primary Examiner*—Meng-Al T. An
*Assistant Examiner*—Charles Emeka Anya
(74) *Attorney, Agent, or Firm*—Kudirka & Jobse, LLP

(57) ABSTRACT

A data imaging system is managed by a three-tiered system. The lowest, or agent, tier comprises Common Information Model (CIM) provider objects that reside in the host providing the data imaging service and can make method calls on low-level kernel routines that implement the service. The middle, or logic, tier is a set of federated Java beans that communicate with each other, with the CIM providers and with the upper tier of the system and provide the business logic for the system. The upper, or presentation, tier of the inventive system comprises web-based presentation programs that can be directly manipulated by management personnel to view and control the system from virtually anywhere in the network.

29 Claims, 16 Drawing Sheets

METHOD AND APPARATUS FOR MANAGING A DATA IMAGING SYSTEM USING CIM PROVIDERS IN A DISTRIBUTED COMPUTER SYSTEM

FIELD OF THE INVENTION

This invention relates to management of networked computer systems and to data services, such as "snapshots" or imaging and, in particular, to distributed management of data volumes in connection with such services.

BACKGROUND OF THE INVENTION

It is common in many contemporary computer systems to require continuous access to stored information. The conventional data center procedure of taking data storage systems offline to update and backup information is not possible in these computer systems. However, system reliability demands the backup of crucial data and fast access to the data copies in order to recover quickly from human errors, power failures and software bugs. In order to recover from natural disasters, it is common to share data among geographically dispersed data centers.

The prior art has generated several solutions to meet the aforementioned data backup and sharing needs. One prior art solution is data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized."

Data replication can be performed at various levels. For example, the entire database may be mirrored. However, tight synchronization between the primary and mirrored data for an entire database often introduces a significant system performance penalty because of the large number of data update transmissions between the primary and secondary sites that are necessary to ensure transaction and record consistency across the entire database.

To improve system performance when data replication is used some data replication systems replicate only portions of the data. For example, replication may take place at file-level. Conventional file-level replication systems are often incorporated in the software drivers on the host and generally employ conventional networking protocols, such as TCP/IP, to connect to the remote data site over a local or wide area connection.

Alternatively, in other prior art systems, data replication takes place at the volume level, where a volume is a logical, or physical, disk segment. Instead of replicating database transactions or file systems, this technique replicates logical or, in some cases, physical disk volumes. Volume replication is flexible in the sense that it is generally independent of the file system and volume manager software. Volume replication can also be used in conjunction with database and file replication to help ensure that not just the data specific to the database or a particular file system, but all relevant data is replicated to the remote site.

In still other prior art systems, utility software is provided that generates a copy of a data volume at a particular point in time. This data copy is often called a data "snapshot" or "image" and provides a system administrator with the ability to make, and to maintain, replicated data storage systems. The advantage of making snapshots of data volumes is that the snapshot process is relatively fast and can be accomplished while other applications that use the data are running. Accordingly, the process has minimal impact on ongoing data transactions. In addition, the data image can be used to synchronize volumes in a data replication system.

In such as system, the original copy of the data is maintained on a "master volume", where the applications store data. Using the snapshot process, the master volume at a particular point in time is copied to what is called a "shadow volume" on the same host. After it is created, the shadow volume can be read from, and written to, by another application and it can be used for system tests with a copy of real data without the danger of corrupting the original data.

As the data changes in the master volume and the shadow volume, a "bitmap volume" keeps track of the blocks that change so that to update the shadow or the master volume, only the blocks marked as changed by bitmap entries need be copied. This method provides quick updates that intrude minimally on system performance with normal business data requirements.

Still other data services can be provided in prior art systems. These include data caching and notification services. No matter which of the data services are used, a significant amount of management time can be consumed in initially setting up the data service and managing it after it is running. For example, management of each of the aforementioned data imaging service requires the ability for a manager to discover volumes existing in the system. On top of the ability to discover the volumes, those volumes must be verified as suitable for data service use and may have to be configured if they are not suitable. Finally, the manager must configure the master and shadow volume "set" for data imaging and then start the imaging process.

In a large, distributed computer system connected by a network, management personnel and resources typically manage the system from a system console. However, the data manipulation processes, which actually perform the data imaging services, are typically low-level routines that are part of an operating system kernel running on a particular machine. These routines typically must run on that machine and must be written in platform-dependent language. Thus, prior art systems required a manager to physically log onto each local host in a distributed system in order to discover the volumes on that local host, verify their usability and set up the volume set.

Therefore, there is a need to provide a simple, fast way to discover volumes on hosts, verify their usability and set up and manage a data imaging service and to provide coordination information to a manager.

SUMMARY OF THE INVENTION

In accordance with the principles of the present invention, management of data services is provided by a three-tiered system. The lowest, or agent, tier comprises Common Information Model (CIM) provider objects that reside in the host providing the data service and can make method calls on the low-level kernel routines. The middle, or logic, tier is a set of federated Java beans that communicate with each other, with the management facades and with the upper tier of the system. The upper, or presentation, tier of the inventive system comprises web-based presentation programs that can be directly manipulated by management personnel to view and control the system.

In one embodiment, each CIM provider instance operates in a CIM object manager (CIMOM) running in the host providing the service and is represented by a management facade that is created and deleted by a management facade factory when the CIM provider instance is created and deleted.

In one embodiment, a data imaging management facade runs on a selected host and the federated beans including at least one data imaging bean also run on that host. A manager can interact with the beans via web-based graphic user interfaces (GUIs) that use a lookup service to obtain a proxy to selected federated beans. The GUIs then use that proxy to make methods calls on the beans to manage the data services controlled by the beans.

In another embodiment, the data imaging management facade and the federated beans run on a dedicated management server that is connected to the hosts by a network and is located in a shared Jiro™ station.

In yet another embodiment, another federated bean stores the configuration of the data imaging system. This latter bean can be interrogated by the data-imaging bean to determine the current system configuration.

In still another embodiment, a data service volume bean locates and prepares volumes that can be used by the data imaging system.

BRIEF DESCRIPTION OF THE DRAWINGS

The above and further advantages of the invention may be better understood by referring to the following description in conjunction with the accompanying drawings in which.

DETAILED DESCRIPTION

Data Services are software products that consist of two parts: a set of kernel drivers, which provides the actual service on local host platforms, and the user level management software. The kernel drivers would generally by implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

Figures 1A, 1B:
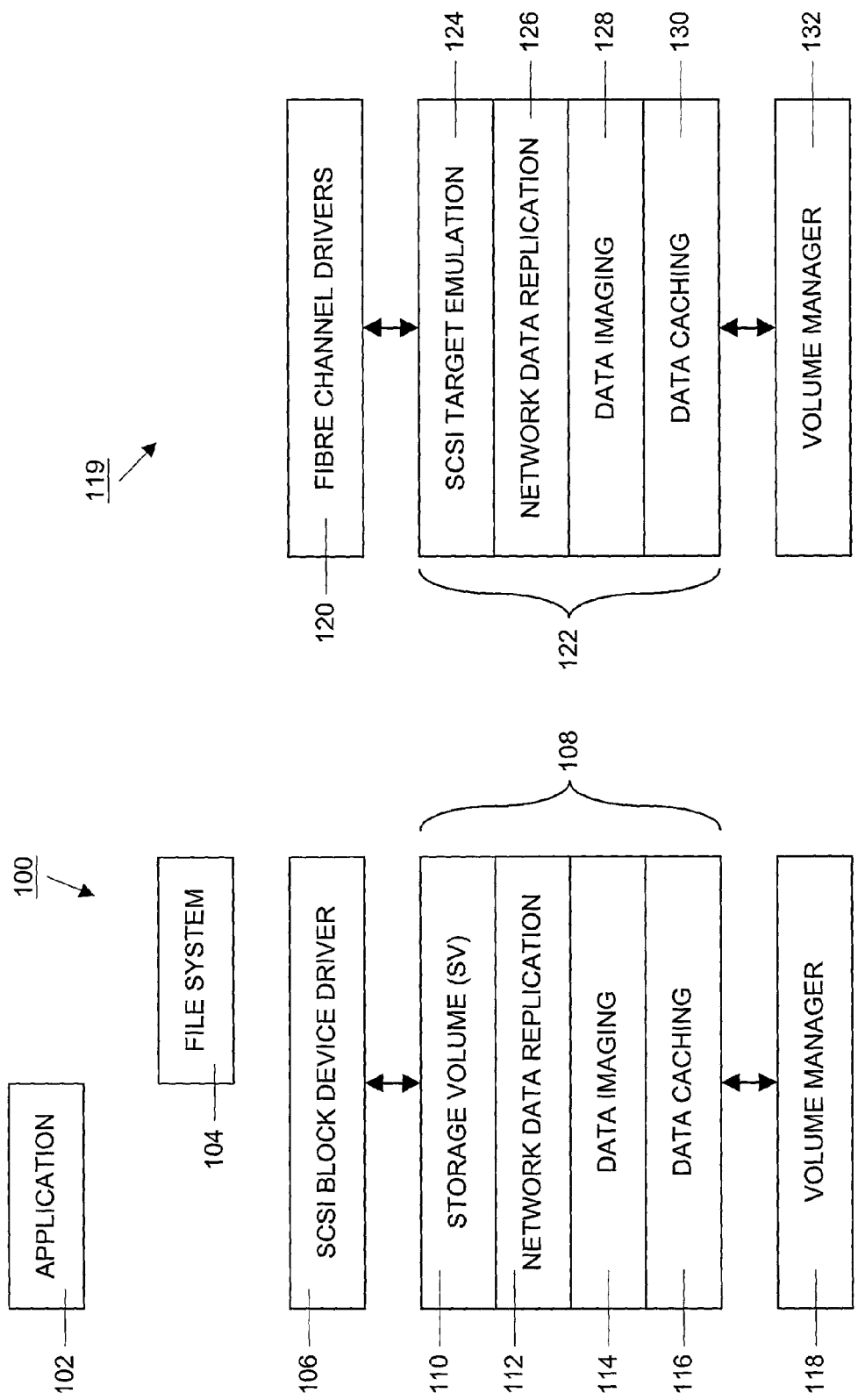
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

As shown in FIG. 1A, on an application server 100, the data service kernel modules 108 layer within the operating system I/O stack above volume manager 118 and below the disk device drivers 106. The data service kernel modules include a storage volume module 110 that implements a storage volume (SV) interface data service that provides data redirection. In particular, the storage volume layer 110 insinuates itself between the standard Small Computer Standard Interface (SCSI) block device driver 106 and the underlying drivers and shunts I/O information through the other data service kernel modules 112–116.

The storage network data replicator (SNDR) kernel module 112 provides data replication services that involve transparent replication of volumes over public or private Internet protocol infrastructure, or locally, via SCSI protocol, over fibre channel connections.

The data imaging module 114 implements a "point-in-time" volume copy data service between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging module allows data updates to be sent from the master volume to the shadow volume as well as updates to be sent from the shadow volume to the master volume when desired.

The caching module 116 provides block based caching operations for disk input/output. These operations provide typical caching functionality, such as read caching, read ahead and small write coalescing for sequential writes. Module 116 also provides write caching when non-volatile RAM cards are installed as a safe store (called a "fast write cache").

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts whereas local volumes must be SVI volumes.

A data services management system constructed in accordance with the principles of the invention comprises three layers or tiers. The presentation tier comprises a collection of GUIs with which a manager interacts at a single host location. The presentation tier, in turn, interacts with a middle, or logic, tier comprised of a plurality of federated beans, each of which performs specific tasks in the data services system. Some of the beans can communicate with management facades that are also located in the logic tier. Management facades represent, and communicate with, CIM providers located in the lowest or agent tier. The CIM providers control the aforementioned kernel modules that actually perform the data services. In this manner, an entire data service system can be configured and managed from a single location.

Figure 2:
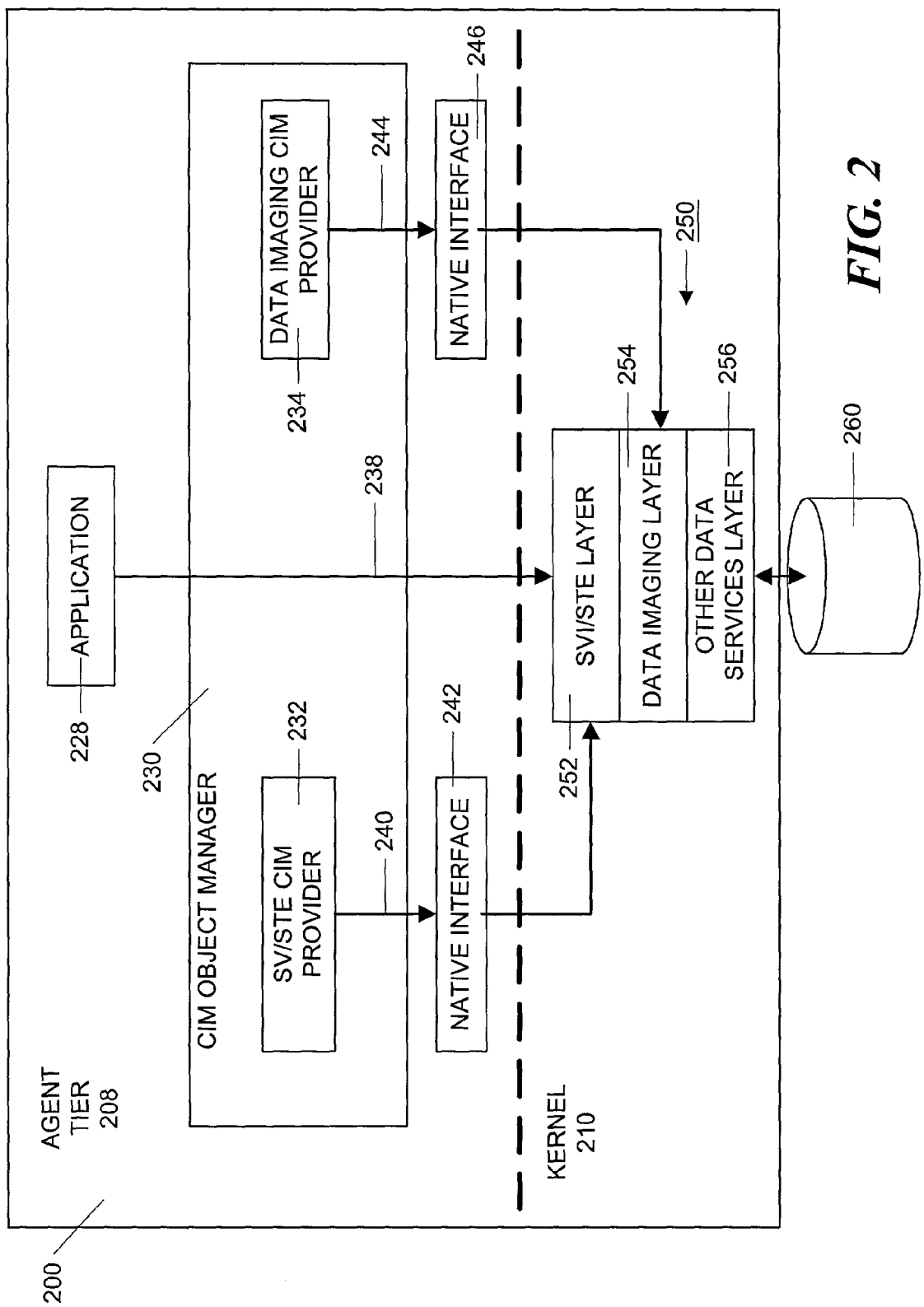
FIG. 2 is a block schematic diagram of software that runs in a local host for providing a data imaging service, illustrating a CIM object manager and CIM providers that, via native interfaces, access the kernel layers that provide the data imaging service.

FIG. 2 shows a host system 200 that illustrates the contents of the agent tier running in a single host. The data imaging management capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate. Application programs running in host 200, such as application 228, and the host file system access resource 260 though the layered stack 250 as indicated schematically by arrow 238.

In order to provide for data service management capability in accordance with the principles of the invention, the SVI/STE layer 252 and the data imaging layer 254 are controlled by software running on the lower tier 208 of the inventive data services system. The lower tier includes a native interface 242 that converts the APIs exported by the SVI/STE layer 252 into a platform-independent language, such as Java™.

An object, called a CIM provider 232, provides the required remote management capability and controls the native interface 242 as indicated schematically by arrow 240. The Common Information Model, or CIM, is an object-oriented information model for describing managed resources such as disks, CPUs, and operating systems. This model is a proposed industry standard that is promulgated by the Distributed Management Task Force, Inc. and is described in detail in the Common Information Model Specification, version 2.2, Jun. 14, 1999. This document is available at http://www.dmtf.org and is incorporated by reference in its entirety.

CIM describes overall management information in a network enterprise environment and is comprised of a Specification and a Schema. The Specification defines the details for integration with other management models, while the Schema provides the actual model descriptions.

In the CIM model, managed resources, such as printers, disk drives, or CPUs are represented by CIM objects. CIM objects can be shared by any WBEM-enabled system, device, or application. CIM objects with similar properties and purposes are represented as CIM classes. Properties are attributes that describe a unit of data for a class. An instance is a representation of a managed object that belongs to a particular class. Instances contain actual data. For example, Solaris_ComputerSystem is a CIM class that represents a computer that runs the Solaris™ operating environment. Solaris is a trademark of Sun Microsystems, Inc. The Solaris software that runs on a SUN workstation is an instance of the Solaris_OperatingSystem class. ResetCapability and Install-Date are examples of properties of the Solaris_Computer-System class.

Each schema comprises a meaningful collection of CIM classes with a single owner (an organization). Schemas are used for administration and class naming and each CIM class can belong to only one schema. All class names must be unique within a particular schema. The schema name is the determining factor in differentiating classes and properties from others that may have the same name.

The Common Information Model categorizes information from general to specific and each CIM schema is divided into three layers of information. These include a core layer that comprises a subset of CIM not specific to any platform and a common layer that comprises information which visually depicts concepts, functionality, and representations of entities related to specific areas of network management, such as systems, devices, and applications. The third layer is an extension layer that comprises information models that support the CIM Schema and represent a very specific platform, protocol, or corporate brand.

CIM objects are, in turn, managed by a CIM Object Manager (CIMOM) that stores the CIM objects internally as Java classes. A Managed Object Format (MOF) language is used to specify a CIM schema. Classes and instances are defined using either Unicode or UTF-8, and placed in a MOF file that resides in the CIM Object manager. When the CIM object manager starts, the MOF files are submitted to a MOF compiler. The MOF compiler parses the file and adds the classes and instances defined in the file to the CIM Object Manager repository.

When a client application accesses information about a CIM object, the CIM Object Manager contacts either an appropriate CIM "provider" for that object or a CIM Object Manager repository that contains data regarding the objects. A CIM provider is a class that communicates with managed objects to access data.

More specifically, when a client application requests data from a managed resource and the data is not available from the CIM Object Manager repository, the CIM Object Manager forwards the request to the provider for that managed resource using object provider APIs to communicate with providers. The provider then contacts the resource and dynamically retrieves the information. For example, in response to a request from the CIM Object Manager to retrieve information regarding a device, a provider gets native information from a device, maps the native information format to CIM classes, and passes the information to the CIM Object Manager in the form of the CIM classes. In response to a request to send information to a device, a provider maps the information from CIM classes to native device format, gets the required information from the CIM class and passes the information to the device in native device format.

In FIG. 2, two CIM providers are shown in CIM object manager 230. These include the SV/STE CIM provider 232 that interfaces with native interface 242 as indicated schematically by arrow 240 to send information to, and receives information from, the SV/STE layer 252 and CIM provider 234 that interfaces with native interface 246, as indicated schematically by arrow 244, to pass information to and from data service layer 254. CIM provider 234 actually represents a plurality of data imaging CIM providers that manage individual components of the data imaging services provided by data service layer 254. These providers are shown in more detail in FIG. 3.

Similarly, one or more providers and native interfaces would be provided for each specific data service that is running on the host and controlled by other layers 256. For example, the host shown in FIG. 2 could be running one or more data services, including network data replication services, cache management services, and data volume management services.

Figure 3:
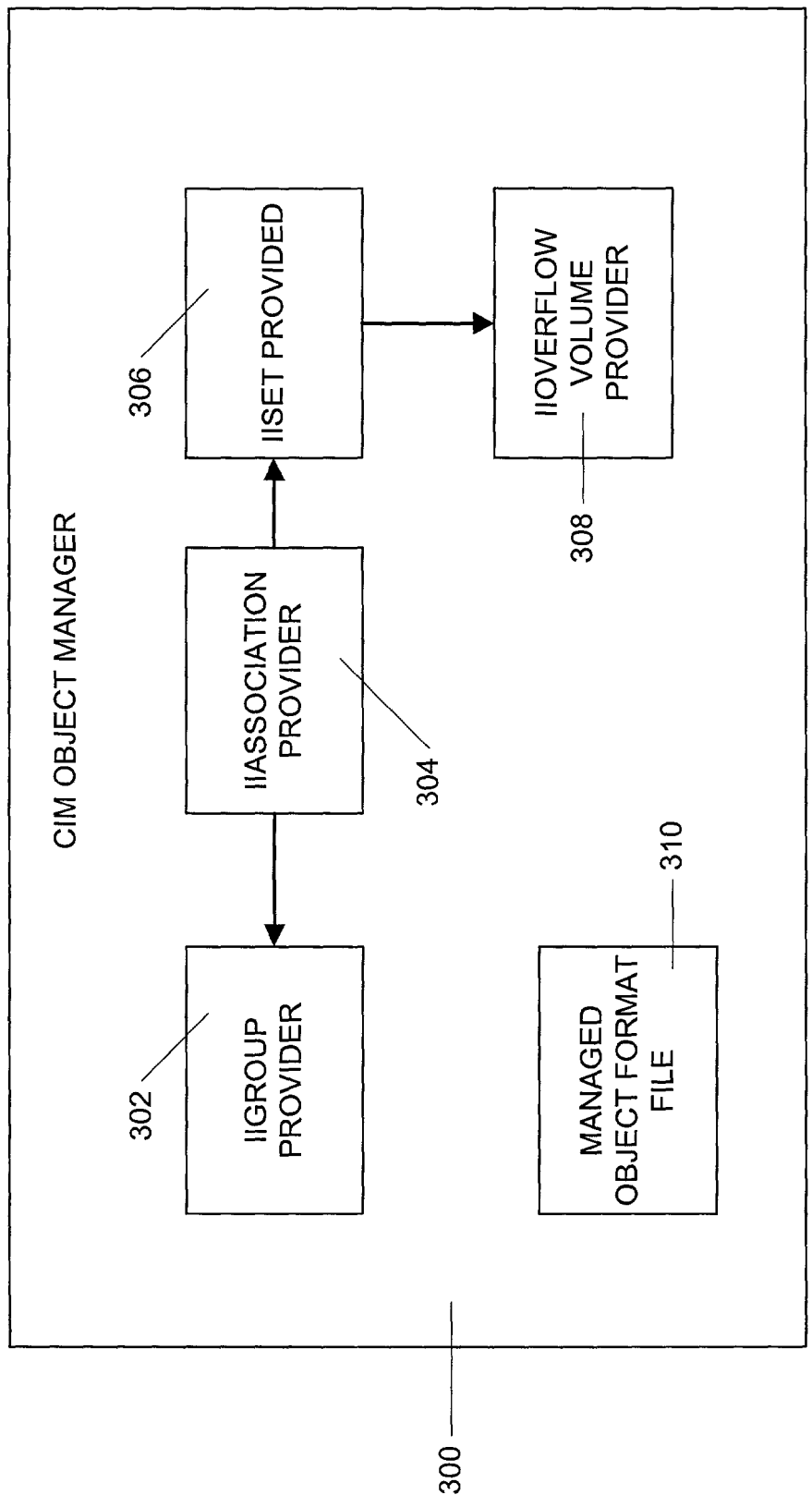
FIG. 3 is a schematic block diagram illustrating, in more detail, the CIM object manager shown in FIG. 2 and the specific CIM providers that are used to provide the data imaging service.

FIG. 3 illustrates the CIM providers that are used to implement the data imaging service. In order to understand the operation of the data-imaging bean, the concept of an Instant Imaging™ (II)Set and an IIGroup need to be introduced. An IISet is an operational entity that contains information regarding the original data copy (the master volume), the point-in-time data copy (the shadow volume) and the bitmap volume that keeps track of changed data blocks that occur in changes made to the master and shadow volumes.

Shadow volumes can be specified as independent types. When an independent shadow volume is created, a full volume copy occurs from the master volume to the shadow volume so that, when the copy operation completes the shadow volume is identical to the master volume, excluding any application writes that occurred to the shadow volume while the copy operation was in progress. Thus, the size of the shadow volume must be equal to, or greater than the size of the master volume, preferably the volumes are the same size. After, the point-in-time copy is made, applications can read and write to either the master or the shadow volumes. Of course, once a write has occurred, the master and shadow volumes are no longer identical.

Alternatively, the shadow volume can be a dependent type. When a dependent shadow volume is created, no full volume copy occurs. Instead, any reads directed to the shadow volume are answered with data from the master volume. When a write occurs to the master volume, the original data in the master volume that will be overwritten is written first to the shadow volume, then the new data is written to the master volume. The location of the changed data in the master volume is tracked on the bitmap volume. Any read to the shadow volume that requests data from a changed data block (as determined by the bitmap volume) is answered from the shadow volume which contains only original point-in-time data. The shadow volume does not contain new master volume data unless an update or copy command is issued by a manager.

Since the dependent shadow volume does not contain a full copy of the original master data, it does not have to be equal in size to the master volume. If the dependent shadow volume is smaller than the master is, it is called a "compact" shadow volume (also called short-shadow volume). Compact shadow volumes are associated with an overflow volume which can be used to store any writes to the compact shadow volume which occur after the compact shadow volume becomes full.

The bitmap volume tracks writes to either the master volume or the shadow volume so that updates can be performed from master volume to shadow volume or from shadow volume to master volume. The bitmap can be located on any volume or file system except for the volume that contains the master volume and the volume that contains the shadow volume. Alternatively, the bitmap can be kept entirely in memory. When the master and either independent or dependent shadow volumes are resynchronized, only the changes as noted in the bitmap are copied.

The name of the IISet is taken from the included shadow volume and operations performed using the inventive data imaging software are performed on IISets. In addition, an overflow volume can be attached to an IISet; a single overflow volume can be attached to one or more IISets.

IISets, with or without associated overflow volumes, can also be grouped together to allow the data imaging software to perform the same operation, such as an update or copy operation, on multiple volume sets at one time with a single command. Such as group of IISets is called an IIGroup. An IIGroup can be named and may consist of any number of IISets. Volume sets can be added or deleted from IIGroups without first quiescing the volumes, as discussed below.

If the primary host needs to have some, or all, of its workload removed, the shadow volumes of any or all volume sets can be "exported" so that another host, also running the same data imaging software, can "import" the shadow volumes. The business transactions can then be continued from that second host. The export/import operation has several advantages. For example, exporting can be used as a way to test new data processing operations offline, using real data, before incorporating these operations into an online business. When desired, the shadow volume can be disabled at the second host and then rejoined to its master volume on the primary host with, or without, the changes made by the secondary host.

In order to export a shadow volume, the volume must be an independent shadow and it must be updated just prior to the export so that it matches the master volume exactly. In addition, the shadow volume must reside on a dual-ported device. While the shadow volume remains in the exported status, it cannot be updated by its master, but the master can continue to accept data and track the changes in its associated bitmap.

A secondary host can import the shadow volume with a command that requires that a bitmap volume be named to track changes to the shadow volume while the volume is in the imported status. After the import process in complete, a new volume set can be enabled with the imported shadow volume designated as a master volume. Business operations or technical evaluations can then take place with the new volume set on the secondary host.

The secondary host disables the imported shadow volume when it is finished with it. The primary host can then join the shadow volume to its master volume. If a bitmap for the join is not specified, the primary host bitmap and the secondary host bitmap will be used to join the shadow to the master. If a bitmap is specified, then that bitmap is used in conjunction with the stored data to join the volumes. Because several volume sets may include the same master, it is important to be able to select which bitmap to use for the join operation.

In addition, a master volume may have more than one shadow volume. A new point in time copy may be taken onto a different shadow volume at regular intervals. When this is done, each shadow volume is unrelated to the others. In the case of dependent shadow volumes, writing to the master volume will cause master data to be copied to each of the shadow volumes before being written to the master.

The master may be updated from any of its shadow volumes without changing the contents of the other shadow volumes, subject to space being available on compact dependent shadow volumes.

As shown in FIG. 3, the CIM object manager 300 running in the host that provides the data imaging services can include several CIM providers of which four are shown in FIG. 3. The illustrated CIM providers include an IISetProvider 306, an IIGroupProvider 302, an IIAssociationProvider 304 and an IIOverflowVolumeProvider 308.

The IISetProvider 306 creates and deletes IISets in accordance with client requests. For each IISet, the master, shadow and bitmap volume names as well as the set type (dependent or independent) and the set names can be specified during creation. However, the shadow volume is unique for an IISet and hence can be used to retrieve a specific IISet instance from the CIM object manager repository.

Various methods that can be invoked on a CIM instance of a IISet include "set" methods for setting the name and type of the IISet and various "get" methods for retrieving the name, type, master volume name, shadow volume name, bitmap volume name and overflow volume name. An updateMasterToShadow( ) method that initiates a master volume to shadow volume update process for a specified volume set. If the specified set is assigned to an IIGroup, then this operation must be initiated from the associated IIGroup. A copyMasterToShadow( ) method initiates a master to shadow volume copy process for a specified volume set. If the set is assigned to an IIGroup, this operation must be initiated from the associated IIGroup.

An updateShadowToMaster( ) method that initiates a shadow volume to master volume update process for a specified volume set. If the specified set is assigned to an IIGroup, then this operation must be initiated from the associated IIGroup. A copyShadowToMaster( ) method initiates a shadow to master volume copy process for a specified volume set. If the set is assigned to an IIGroup, this operation must be initiated from the associated IIGroup.

A getPercentCompleted( ) method returns the percent of a volume copied between master and shadow volumes. A getPercentSynchronized( ) method returns the percent of a volume updated between master and shadow volumes. An exportVolume( ) method exports the shadow volume of the IISet object for use by another system. A joinVolume( ) method joins the shadow volume of the IISet object with a specified bitmap that was previously exported. The bitmap supplied is the bitmap used on the foreign host that tracked changes while the export process was proceeding.

attachOverflowVolume( ) and detachOverflowVolume( ) methods attach and detach a specified overflow volume to the set represented by the IISet object. In the case of a detach operation, if the overflow volume is active, the method will fail.

The IIGroup Provider 302 creates and deletes IIGroups in accordance with client requests. For each IIGroup, the name of the group along with the type (independent or dependent) of IISets that are part of the group can be specified. Various methods that can be invoked on a CIM instance of IIGroup include "set" methods for setting the name and type of the IIGroup and various "get" methods for retrieving the name and type. Additional methods include an addIISet( ) method that adds a specified IISet of a compatible type to the group represented by the IIGroup object. The added set and the current group must not be in an active operation and the set must not be already contained in another group. Likewise, the removeIISet( ) removes a specified IISet from the group. The removed set and the current group must not be in an active operation.

A copyMasterToShadow( ) method initiates a master to shadow volume copy process for all IISets in the group as an atomic operation. An updateMasterToShadow( ) method that initiates a master volume to shadow volume update process for all IISets in the group.

An updateShadowToMaster( ) method that initiates a shadow volume to master volume update process for all IISets in the group as an atomic operation. A copyShadowToMaster( ) method initiates a shadow to master volume copy process for all IISets in the group as an atomic operation. An isSetInGroup( ) method tests if the specified IISet is in the current group or returns null if a null value is specified. The getIISets( ) method returns an array of IISet objects maintained by the IIGroup.

A getPercentCompleted( ) method returns the percent of volumes in the group copied between master and shadow volumes.

The IIAssociation Provider 304 relates IISets and IIGroups together by providing references to related sets, groups and overflow volumes.

An IIOverflowVolume Provider creates and deletes CIM instances of overflow volumes that IISets can use when their shadow volume is smaller in size than their master volume.

The providers are described in a managed object format (MOF) file that is required and resides in the CIM object manager. A sample MOF file for the four providers discussed above follows.

| | |
|---|---|
| Title | DS_II.mof |
| Description: | includes instant image set, group, association between group, set. |
| Date: | Dec. 31, 2001 |
| Version | 1.0 |

(c) Copyright 2000, Sun Microsystems, Inc.

```
#pragma Locale ("en-US")
    [Provider("IIGroupProvider")
    ]
class DS_IIGroup
{
    // ii group property
    [key]
    string groupType;
    // ii group methods
    string getName(
        [IN]
        string groupName
    );
    boolean addIISet(
        [IN]
        DS_IISet set
    );
    boolean removeIISet(
        [IN]
        DS_IISet set
    );
    boolean isSetInGroup(
        [IN]
        DS_IISet set
    );
    String getGroupType( );
    DS_IISet set IISets( );
    boolean copyMasterToShadow( );
    boolean updateMasterToShadow( );
    boolean copyShadowToMaster( );
    boolean updateShadowToMaster( );
    float getPercentCompleted( );
    boolean abort( );
    boolean suspend( );
    boolean resume( );
    boolean lock( )
    boolean unlock( );
};
    [Provider("IISetProvider")
    ]
```

-continued

```
class DS_IISet
(
    String masterVolume;
    [key]
    string shadowVolume;
    String BitmapVolume;
    [key]
    String setType;
    String setName;
    // methods
    String getName( );
    String setName(
        [IN]
            String name
    );
    float getPercentCompleted( );
    float getPercentSynchronized( );
    String getType( );
    String getMasterVolume( );
    String getShadowVolume( );
    String getBitmapVolume( );
    String getOverflowVolume( );
    boolean copyMasterToShadow( );
    boolean updateMasterToShadow( );
    boolean copyShadowToMaster( );
    boolean updateShadowToMaster( );
    boolean abort( );
    boolean suspend( );
    boolean resume( );
    boolean exportVolume( );
    boolean joinVolume(
        [IN]
            String BitmapVol
    );
    boolean attachIIOverflowVolume(
        [IN]
            String overflowVol
    );
    boolean detachOverflowVolume( );
);
[Provider("IIOverflowVolumeProvider")
]
class DS_IIOverflowVol
(
    [key]
    string overflowVolPath;
    // method
    DS_IISet getIISets( );
);
[Association,
Provider("IIAssociationProvider")
]
class DS_IIGroupSetAssoc
(
    DS_IIGroupREF groups;
    DS_IISet REF groupedby;
);
[Association,
Provider("IIAssociationProvider")
]
class DS_IISetOverflowVolssoc
(
    DS_IISet REF owns;
    DS_IIOverflowVol REF ownedby;
);
```

Figure 4:
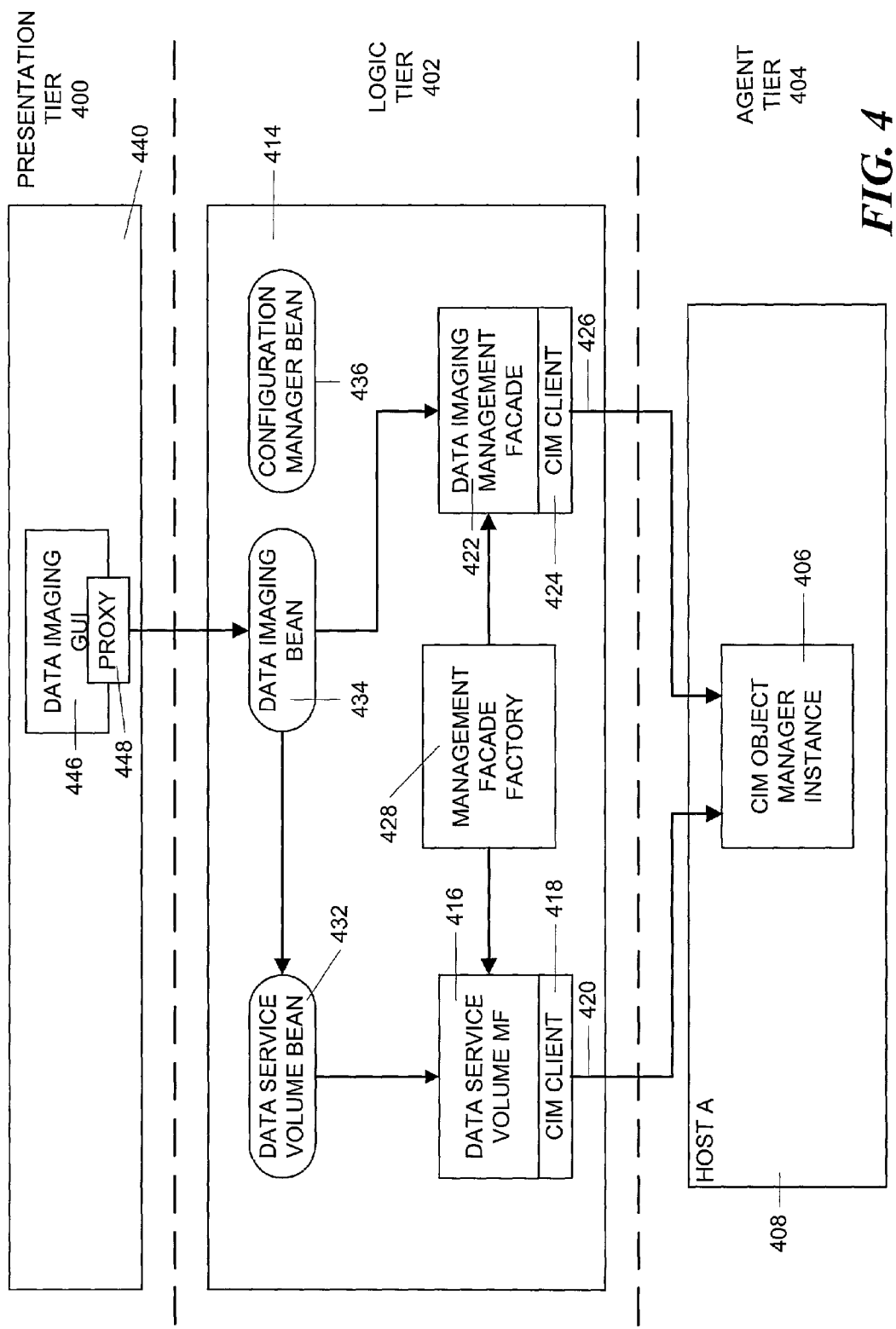
FIG. 4 is a block schematic diagram of a three-tiered system including the agent tier illustrated in FIGS. 2 and 3, a logic tier running in a management server and implemented with federated beans and a presentation tier that can run elsewhere in the network.
Figure 5:
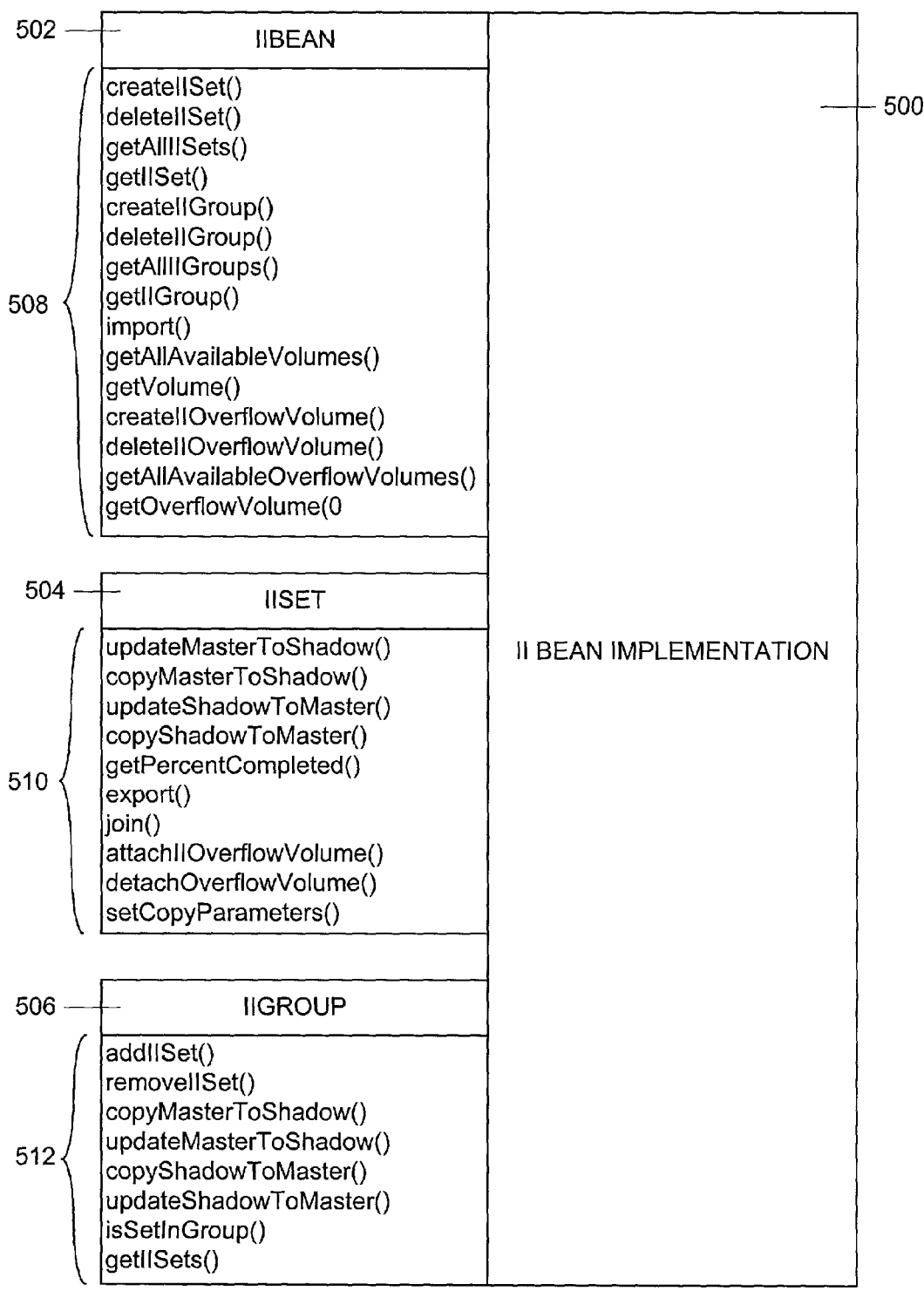
FIG. 5 is a schematic diagram of interfaces exported by the data imaging federated bean.

FIG. 4 illustrates the three tiers of the present invention including a presentation tier 400, a logic tier 402 and the agent tier 404. As shown, the agent tier 404 contains a single host 406, but the system may contain additional hosts. Each host would be arranged as shown in FIG. 2 with a CIM object manager and CIM providers. The CIM object manager for host 406 is shown as object manager 408. The providers have been omitted from FIG. 4 for clarity.

CIM data in CIM objects can be accessed by a CIM client in accordance with a protocol called Web Based Enterprise Management (WBEM). WBEM is an industry-wide initiative that includes standards for web-based management of systems, networks, and devices on multiple platforms. This standardization enables system administrators to manage desktops, devices, and networks. WBEM is designed to be compatible with all major existing management protocols, including Simple Network Management Protocol (SNMP), Distributed Management Interface (DMI), and Common Management Information Protocol (CMIP). WBEM encompasses the CIM model, a managed object format (MOF) language for defining CIM classes and instances and an extensible Markup Language (XML), a generalized markup language that can be used to describe managed resources on the web. Details concerning the WBEM protocol can be found on the World Wide Web at http://www.sun.com/solaris/wbem In FIG. 4 two CIM clients, 418 and 424 can access CIM object manager 408 over a connection on the network connecting the computer on which the logic tier 402 resides with the host computer 406. This network connection is indicated schematically by arrow 420. A WBEM client application, such as client application 418, contacts a CIM Object Manager, such as manager 408, to establish a connection, shown schematically by arrow 420, when the client needs to perform WBEM operations, such as creating a CIM class or updating a CIM instance. When WBEM client application 418 connects to the CIM object manager 408, the WBEM client 418 gets a reference to the CIM Object Manager 408, which the client then uses to request services and operations.

The clients 418 and 424 are located in the logic tier 402, which may, for example, be part of a management server 414 located in any computer in the distributed system. This latter host could be host 406 or could be a completely different computer system that is connected to the network. The logic tier 402 is implemented with a plurality of Federated Java™ (trademark of Sun Microsystems, Inc.) beans and management facades. The federated beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html (JSR#9).

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. The framework provides dynamic services beans of the middle tier. Dynamic services require a hosting entity called a "station", which is a mechanism to allow many services to run within a single Java Virtual Machine. Every management domain contains one or more general-purpose shared stations. These stations may be private or shared. For example, the federated beans and management facades of the logic tier 402 can be deployed in a shared Jiro™ station. This Jiro™ station can be located on any host in the system or may be located on a dedicated management server.

In addition, the Jiro™ technology provides a lookup service that is used to register and locate all Jiro™ technology services, including both base and dynamic services, that are available in a management domain. Details of the Jiro™ framework and its use are available in the "Jiro™ Technology SDK Programmer's Reference Manual" available at http://www.jiro.com, which manual is incorporated by reference in its entirety.

For data imaging service management purposes, the main federated bean is the data imaging service configuration bean 434. Bean 434 is a Federated Bean as described in the aforementioned Federated Management Architecture (FMA) specification. When created, it registers itself with a local Jiro™ station, and provides its services to other federated beans within the same Jiro™ management domain.

Bean 434 interacts with a data imaging service management facade 422 that, in turn, connects to the CIM client 424. The management facade 422 provides a means by which the CIM client 424 can be accessed and managed as a Jiro™ service, i.e., a service that can be managed in a distributed environment from a remote host. The management facade 422 is essentially an object-oriented model of the CIM client 424 and provides a collection of APIs to manage the CIM client 424. Management facades, such as management facade 422 are created and destroyed by a management facade factory 428. The management facade factory 428 will instantiate and delete data services management facades, such as facade 422, upon receipt of appropriate intrinsic CIM instance creation/deletion events from the CIM object manager 406 when CIM providers (not shown in FIG. 4) are created and deleted in the host 408.

Data services have some common usage rules. For example, any data storage volume used by the data imaging service must be identified to the volume control services (SV or STE as appropriate.) Thus, a common data service configuration bean 432 is implemented to handle these data service specific issues. The storage allocation service interacts with this common bean 432 as appropriate to manage the overall storage allocation, via the SV or STE kernel layers discussed with respect to FIGS. 1A and 1B.

Bean 432 interacts with a data imaging service management facade 416 that, in turn, connects to the CIM client 418. The management facade 416 provides a means by which the CIM client 418 can be accessed and managed as a Jiro™ service, i.e., a service that can be managed in a distributed environment from a remote host. The management facade 416 is essentially an object-oriented model of the CIM client 418 and provides a collection of APIs to manage the CIM client 418. Management facade 416 is also created and destroyed by management facade factory 428.

In addition, whenever changes are made in the configuration of the data services, both the DSV bean 432 and the data imaging bean 434 can inform a configuration manager bean 436 of the change in configuration information. Data imaging bean 434 also retrieves configuration information from the configuration manager bean 436 under appropriate situations. The configuration manager bean 436 maintains a persistent view of the configuration of the data services. In this manner, if the system is interrupted during an operation, it can be restored to the proper state when the operation is resumed.

The presentation tier 400 is comprised of web-based GUI components running in a host 440 that could be any host that is connectable to the system via the Internet. The GUI component 446 would generally be generated via a conventional web browser as discussed below. When the GUI 446 is invoked via the web browser, it uses the aforementioned Jiro™ lookup service to obtain a proxy 448 to a corresponding federated bean 434. The GUI 446 uses this proxy 448 to make method calls on the federated bean 434 to configure and control the data imaging system. Alternatively, the GUI 446 may use the services of a webserver in a remote management server to locate and control the federated bean 434. This latter type of operation is described in more detail in connection with FIGS. 8, 12A, 12B and 13A–C.

The data imaging (Instant Imaging) Federated Bean (IIBean) comprises an implementation 500 that is created by a constructor for a particular Jiro™ domain. When created, the IIBean 434 attempts to connect to an IIAdminMF interface in the data imaging management facade 422. The IIBean implementation 500 has three interfaces, an IIBean interface 502, an IISet interface 504 and an IIGroup interface 506. The IIBean interface 502 includes a number of methods 508. In order to simplify the diagram, some conventional "get" and "set" methods have been omitted from methods 508. In general, these methods track the methods of the CIM providers.

For example, methods 508 include a createIISet( ) method that creates an IISet object associated with a master volume, a shadow volume and a bitmap volume with names specified in the method parameter list. A deleteIISet( ) method deletes an IISet object specified by name or object ID and restores all the associated volumes back to the volume pool.

A getAllIISets( ) method returns an array of all configured IISets maintained by the IIBean federated bean. If no IISet is configured, an array of zero length IISet specifications is returned. The getIISet( ) method accepts a set name and returns an IISet object with the specified name. It returns null if the name is not found or is null. The createIIGroup( ) method creates an IIGroup object with a name specified as a parameter. The group includes a specified initial collection of IISets in the group with a specified type (independent or dependent.) All elements in the IISet collection must be the same type and must not currently in an active operation. The deleteIIGroup( ) method deletes a specified IIGroup from the IIBean. The getAllIIGroups( ) method returns an array of IIGroup objects maintained by the IIBean. The getIIGroup( ) method returns an IIGroup object with a specified group name. It returns null if the specified name is not found or is null.

The import( ) method imports a shadow volume previously exported using the corresponding bitmap to track changes while the volume is being imported. The getAllAvailableVolumes( ) method returns an array of available volumes that are not yet assigned to any IISet or IIGroup. If no volume is available, an array of zero length is returned. The getVolume( ) method returns a volume with a specified name. It returns null if none is found or the specified name is null.

The createOverflowVolume( ) method creates an overflow volume specified by a provided volume path name or volume ID. The deleteOverflowVolume( ) method deletes a specified overflow volume from the IIBean. The getAllAvailableOverflowVolumes( ) method returns an array of available overflow IIBeanOverflowVolumes for the IIBean. If no overflow volume is found, an array of zero length IIBeanOverflowVolume is returned. Finally, the getOverflowVolume( ) method returns an IIBeanOverflowVolume object with a specified path. It returns null if the specified path is not found or is null.

The IISet interface 504 includes a number of methods 510. As with the IIBean interface 502, in order to simplify the diagram, some conventional "get" and "set" methods have been omitted from methods 510. Methods 510 include an updateMasterToShadow( ) method that initiates a master volume to shadow volume update process for a specified volume set. If the specified set is assigned to an IIGroup, then this operation must be initiated from the associated IIGroup. A copyMasterToShadow( ) method initiates a master to shadow volume copy process for a specified volume set. If the set is assigned to an IIGroup, this operation must be initiated from the associated IIGroup.

An updateShadowToMaster( ) method that initiates a shadow volume to master volume update process for a specified volume set. If the specified set is assigned to an IIGroup, then this operation must be initiated from the associated IIGroup. A copyShadowToMaster( ) method initiates a shadow to master volume copy process for a specified volume set. If the set is assigned to an IIGroup, this operation must be initiated from the associated IIGroup.

The getPercentCompleted( ) method returns the percent of volume copied between master and shadow volumes. The export( ) method exports the shadow volume of the IISet object for use by another system. The join( ) method joins the shadow volume of the IISet object with a specified bitmap that was previously exported. The bitmap supplied is the bitmap used on the foreign host that tracked changes while the export process was proceeding.

The attachOverflowVolume( ) and detachOverflowVolume( ) methods attach and detach a specified overflow volume to the set represented by the IISet object. In the case of a detach operation, if the overflow volume is active, the method will fail. The setCopyParameters( ) method redefines size and delay parameters for a copy operation.

The IIGroup interface 506 includes a number of methods 512. As with the IIBean interface 502 and the IISet interface 504, in order to simplify the diagram, some conventional "get" and "set" methods have been omitted from methods 512. Methods 512 include an addIISet( ) method that adds a specified IISet of a compatible type to the group represented by the IIGroup object. The added set and the current group must not be in an active operation and the set must not be already contained in another group. Likewise, the removeIISet( )removes a specified IISet from the group. The removed set and the current group must not be in an active operation.

A copyMasterToShadow( ) method initiates a master to shadow volume copy process for all IISets in the group as an atomic operation. An updateMasterToShadow( ) method that initiates a master volume to shadow volume update process for all IISets in the group.

An updateShadowToMaster( ) method that initiates a shadow volume to master volume update process for all IISets in the group as an atomic operation. A copyShadowToMaster( ) method initiates a shadow to master volume copy process for all IISets in the group as an atomic operation. The isSetInGroup( ) method tests if the specified IISet is in the current group or returns null if a null value is specified. The getIISets( ) method returns an array of IISet objects maintained by the IIGroup.

Figure 6:
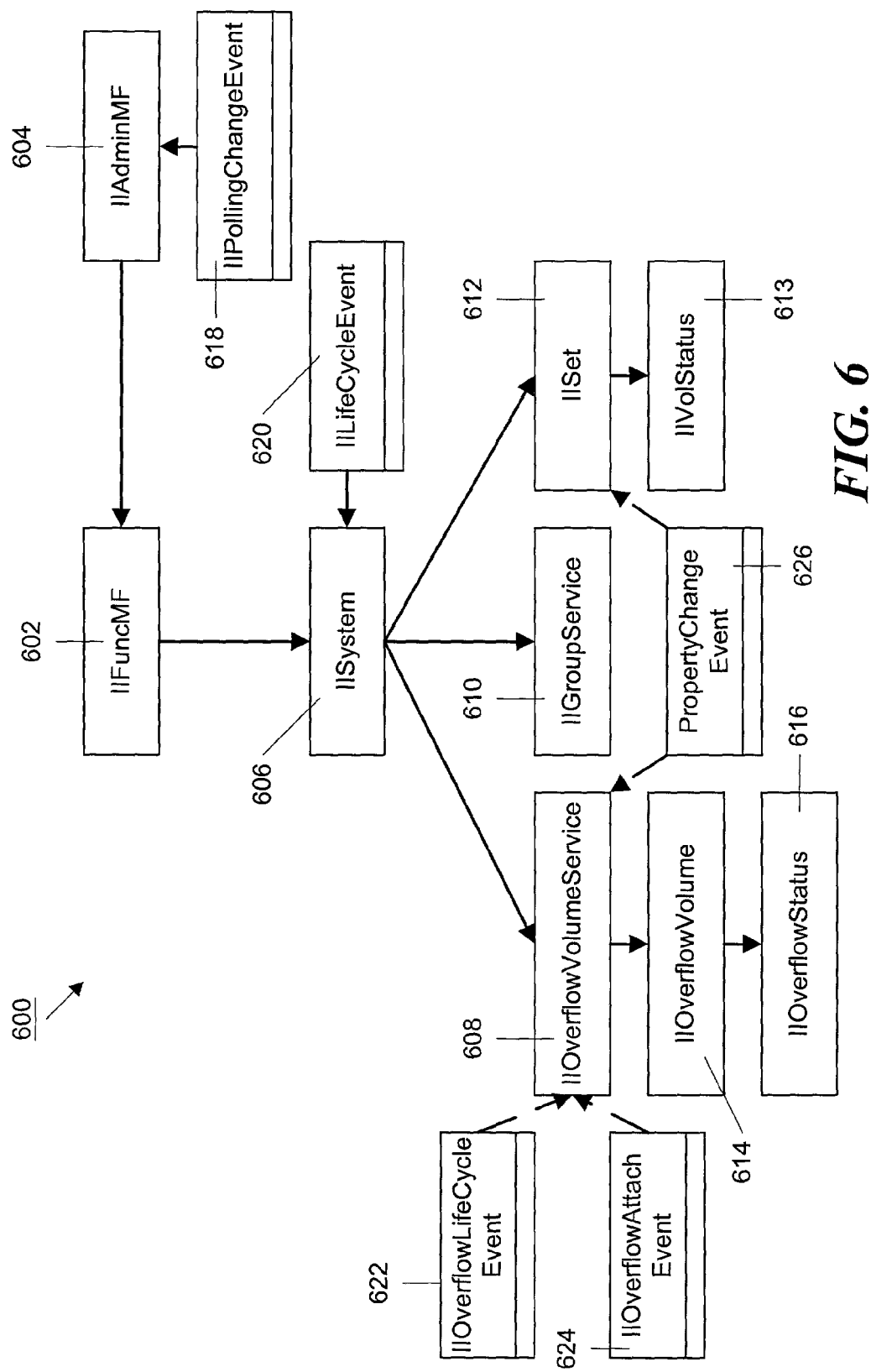
FIG. 6 is a schematic diagram of the interfaces exported by a data imaging management facade.

As previously mentioned, the data imaging bean controls the data imaging kernel layers that actually perform the data imaging by means of a Jiro™-based management facade. FIG. 6 illustrates the data imaging management facade interfaces 600 that are used by the data-imaging bean. The data-imaging bean can lookup the imaging administrative interface, IIAdminMF 604, through the Jiro™ lookup service. The imaging functional interface, IIFuncMF 602, can also be discovered through the Jiro™ lookup service as well as can be retrieved from the IIAdminMF interface 604 using a getIIFuncMF( ) method. Once the data imaging bean gets the imaging functional interface 602, it can call the relevant client interfaces such as IISystem 606 that provides mechanisms to manage the imaging point object and acts as a container for all IISets.

The data imaging bean can also call methods in the IIOverflowVolumeService interface 608 that provides mechanisms to manage overflow volumes in the data imaging system. The IIOverflowVolumeService interface 608 includes the IIOverflowVolume interface 614 methods and the IIOverflowStatus interface 616 that allow the data imaging bean to manager the overflow volumes.

An IIGroupService interface 610 provides mechanisms to manage IIGroups in the data imaging system. Similarly, an IISet interface 612 provides the mechanisms to manage the IISets. The IISet interface 612 includes the IIVolStatus interface 613 that contains mechanisms to determine the status of volumes manager by the data imaging system.

FIG. 6 also illustrates various significant events generated by the management facade. For example, the IIAdminMF interface generates an IIPollingChangeEvent 618 if the polling interval has changed. Similarly, the IISystem interface 606 generates an IILifeCycleEvent 620 upon the occurrence of various life cycle events to the IISystem object (construction, destruction, etc.) Similar life cycle events (IIoverflowLifeCycleEvent 622) are generated by the IIOverflowVolumeService object. The IIOverflowVolumeService object also generates an IIOverflowAttachEvent 624 when an overflow volume is attached to an IISet.

Finally, the OverflowVolumeService objects and the IISet objects generate PropertyChangedEvents 626 when selected properties of these objects are changed.

Figure 7:
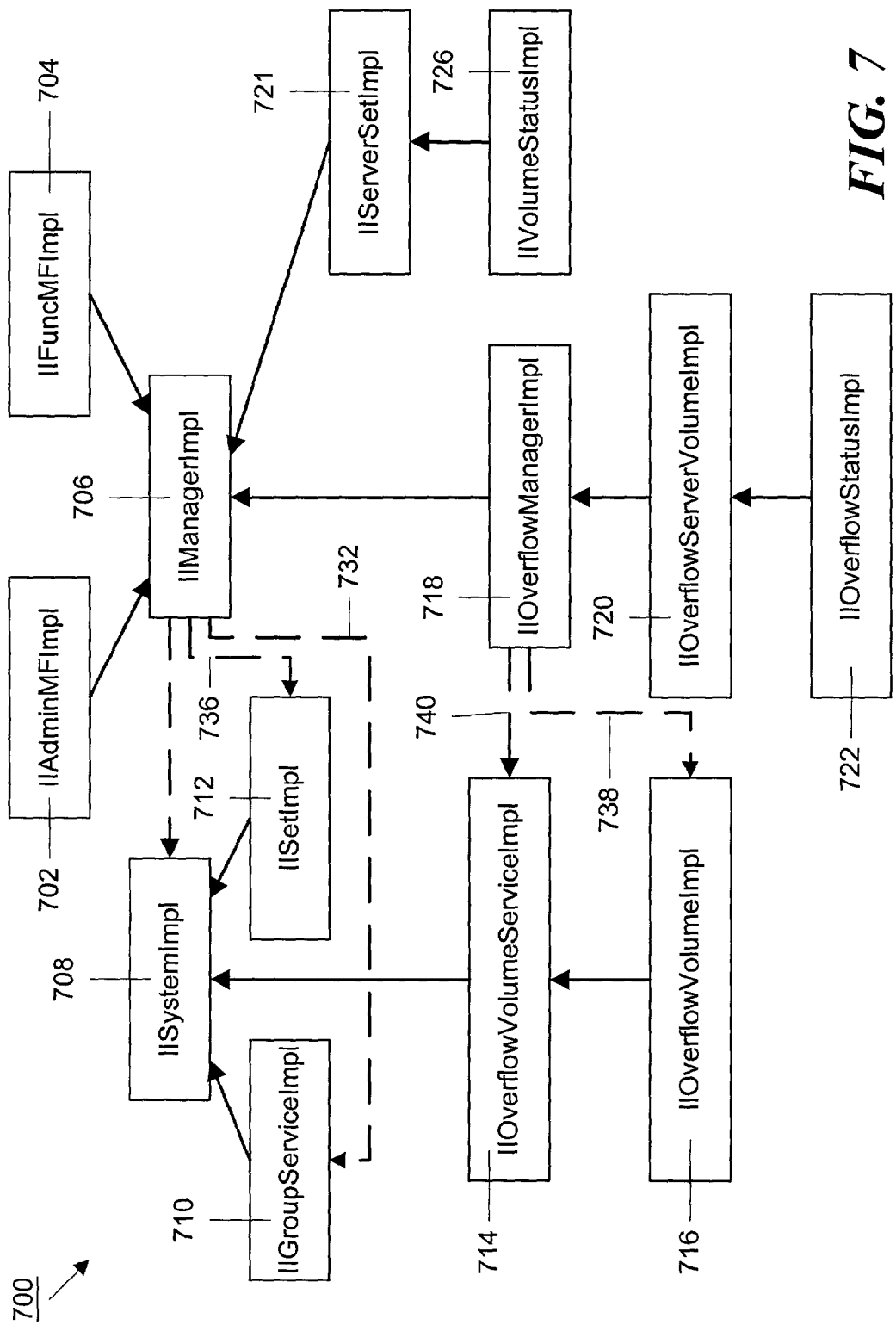
FIG. 7 is a schematic diagram of the implementation classes for the data imaging management facade shown in FIG. 6.

FIG. 7 illustrates the implementation details of the data imaging management facade. In this implementation, several manager objects carry out the underlying operations needed to manage the data imaging service. The IIManagerImpl 706 is the overall coordinator and is controlled by the IIAdminMFImpl 702 and the IIFuncMFImpl 704. The IIManagerImpl 706 delegates the overflow management to the IIOverflowManagerImpl 718 and the IISet management to the IIServerSetImpl 721. The IIManagerImpl further delegates management responsibilities to the IISystemImpl 708 as indicated by arrow 728, the IIGroupServiceImpl 710 as indicated by arrow 732 and the IISetImpl 712 as indicated by arrow 736. The GroupServiceImpl 710, the IIOverflowVolumeServiceImpl 714 and the IISetImpl 712 are part of the IISystemImpl 708.

The IIOverflowManagerImpl 718, in turn, delegates management responsibility to the IIOverflowVolumeServiceImpl 714 as indicated by arrow 734 and to the IIOverflowVolumeImpl 716 as indicated by arrow 736. The IIOverflowVolumeServiceImpl 714 also contains the IIOverflowVolumeImpl 716. The IIOverflowManagerImpl 718 uses the IIOverflowServerVolumeImpl 720 that, in turn, uses the IIOverflowStatusImpl 722. The IIServerSetImpl 721 uses the IIVolumeStatusImpl 726.

As previously mentioned, in one embodiment, the presentation tier 300 is implemented by a web-based GUI. In this embodiment, the web-based GUI for the data imaging management service is based on a framework called the "Struts" framework. The Struts framework is an open source framework useful in building web applications with Java Servlet and JavaServer Pages (JSP) technology. The framework is designed to encourage application architectures based on a Model-View-Controller (MVC) design paradigm. The framework includes, as primary areas of functionality, a controller servlet that dispatches requests to appropriate "Action" classes provided by an application developer, JSP custom tag libraries, and associated support in the controller servlet, that assists developers in creating interactive form-based applications and utility classes to support XML parsing, automatic population of JavaBeans properties based on the Java reflection APIs, and internationalization of prompts and messages. The Struts framework is being developed as part of the Jakarta Project, sponsored by the Apache Software Foundation, The Apache Software Foundation, 1901 Munsey Drive, Forest Hill, Md. 21050-2747. Complete details of the Struts framework can be found at http://jakarta.apache.org/struts.

Figure 8:
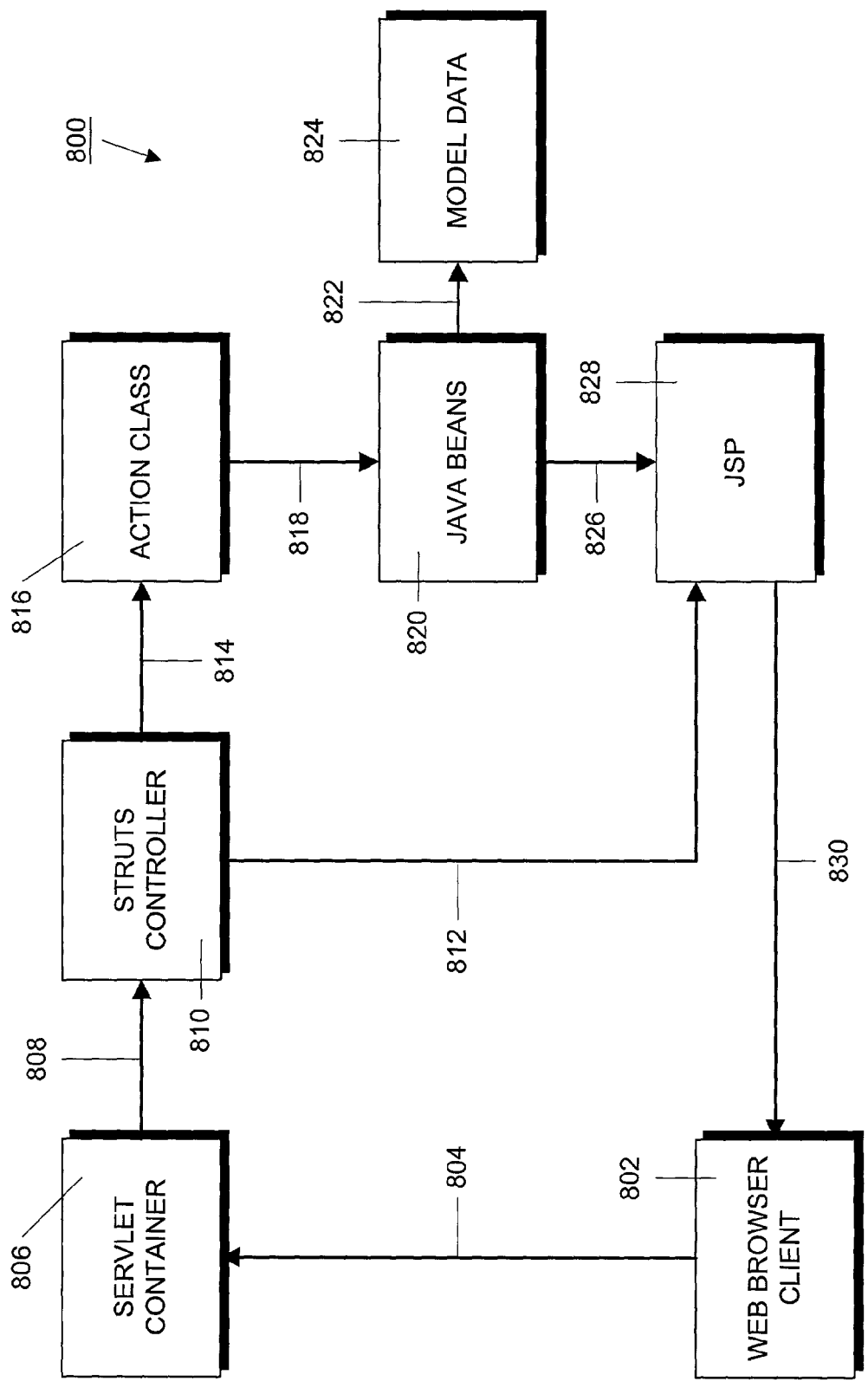
FIG. 8 is a block schematic diagram of a presentation system as implemented using a Struts framework.

FIG. 8 illustrates the overall architecture of the user interface framework 800 used in the illustrative embodiment and based on the Struts framework. The user interacts with a client interface that, in turn, uses the well-known Hypertext Transfer Protocol (HTTP) protocol to communicate with the rest of the system. In one embodiment, the client could be a web browser, such as web browser 802. In other embodiments, the client could be a corresponding command line interface (not shown in FIG. 8.)

For example, the client could be implemented as a form written in HTML which can be displayed in web browser 802 and accept input. Forms for controlling a data imaging service might include a form directed to manipulating IISets (see FIG. 9, below.) This form could accept as input, a set name, two volume names, two bitmap volumes, and options for the set type. Similarly, an HTML form for manipulating IIGroups could accept as input, a group name, multiple set names, and options to attach an overflow volume (see FIG. 10.)

Information retrieved via the client 802 is sent, as indicated by arrow 804, to the servlet container 806 to be processed. The servlet container 806 would normally be container within a web server (not shown in FIG. 8.) Web server software suitable for use with the present invention is Tomcat web server software available from the aforementioned Apache Software Foundation.

Servlets are programs that run within the web server and process requests from an HTTP client. The servlet container that is bundled with the Tomcat web server supports all servlet activity. In this architecture, the servlet container provides the appropriate libraries to process requests. For a data imaging service required libraries include the Jiro™ Federated Bean, Management Facade, and related Jiro and CIM libraries. Once the necessary resources are confirmed, the servlet container passes control to the struts controller 810.

The Struts controller 810 bundles and routes HTTP requests to other objects in the framework. It is responsible for the flow of control and maps requests to the appropriate handlers. The controller 810 creates one instance of an Action class, such as class 816, and uses this instance for all requests. Specifically, for the data imaging system, if the Struts controller 810 can make a successful mapping to an appropriate handler, it will forward to the path name "/IIJiro" to the handler, otherwise it will record a failure and send the error results to the Java Server Pages 828 to be displayed as described below and as indicated schematically by arrow 812.

Action class 816 receives a request from the Struts controller 810 and interprets information in the request. Class 816 then instantiates an appropriate Java Bean with the given information as schematically illustrated by arrow 818. After locating the bean and completing some task, class 816 can also forward the request to another action class (not shown in FIG. 8.) In a data imaging system, the Action class 816 is a DoConnectIIJiroBean class. This class parses and interprets information in a client request, such as the host, volume, and bitmap names that were submitted by the client. Once the parsing is complete, the DoConnectIIJiroBean class instantiates the aforementioned IIBean with the appropriate input and begins to call the bean methods as necessary. This latter action is indicated schematically by arrow 818

Usually, the Java Beans, such as the IIBean, use a form of Java Remote Method Invocation (RMI) to retrieve its data. The model data 824 for this prototype lies in CIM providers objects and Jiro Management Facades. The model data 824 that the II Bean retrieves is sent to the Java Server Pages 828 to be displayed as indicated by arrow 826. In addition, the Java Server Pages 828 can send requests to the Java beans for particular information to display. In the data imaging system, IIBean acts as a wrapper to the data model 824. The IIBean does a lookup of the data model components, that is the management facade or the CIM client, using the Jiro lookup service. Once a proxy to these remote objects is received, real time data from the model data 824 can be retrieved by calling methods on the IIBean.

A Java Server Page 828 is used to incorporate dynamic data into an HTML page. The JSP 828 gets its data from the Java Beans 820 and therefore separates the processing of data from the representation of the data. The JSP 820 then sends its information back to the client browser for display as indicated by arrow 830. In the data imaging system, the JSP 828 creates a reference to the existing instance of IIBean and begins to call the methods on the bean. The information that the bean returns is formatted and displayed to the client by the JSP 828.

Figure 9:
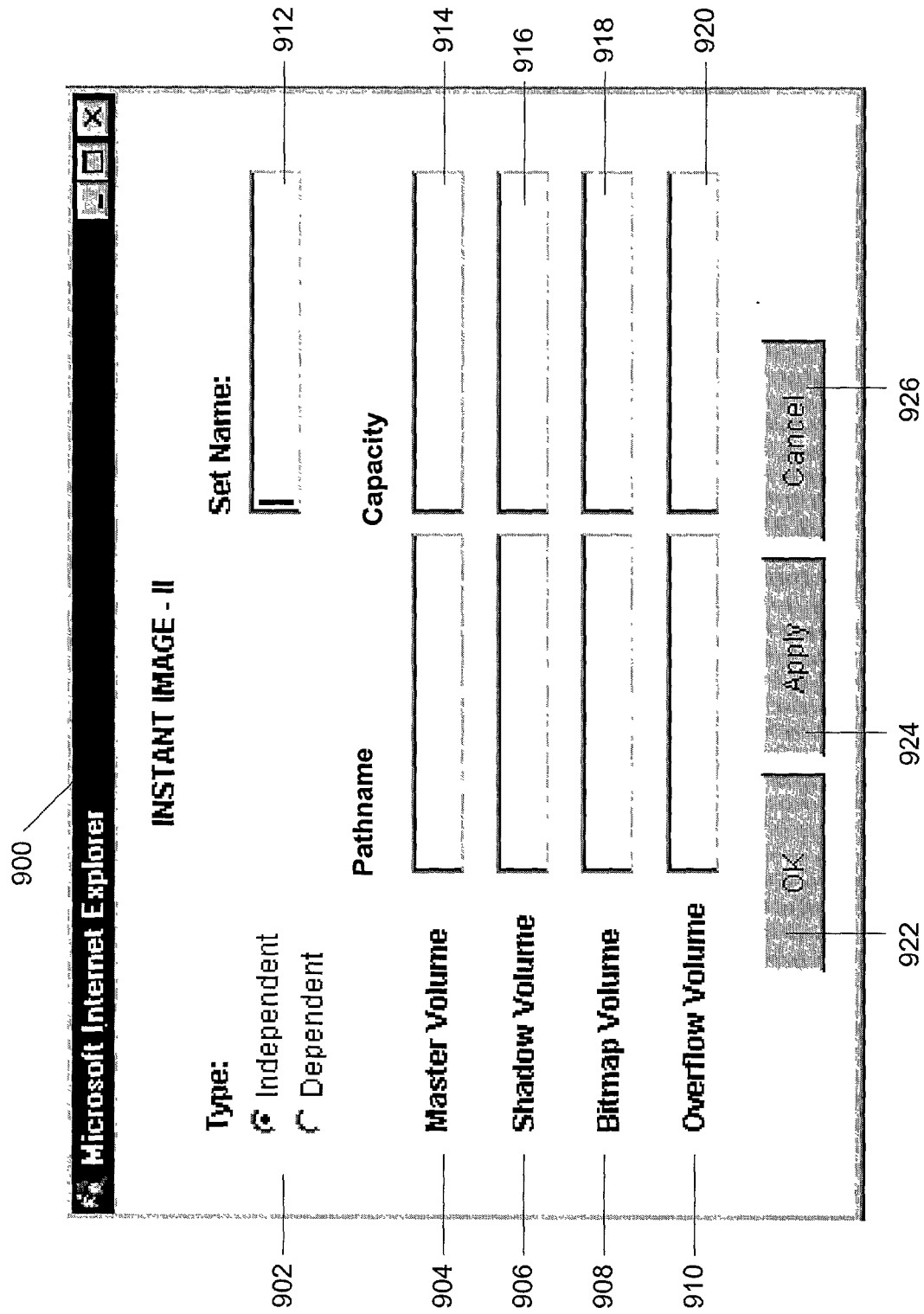
FIG. 9 is a screen shot of a screen display generated by a graphic user interface that controls a data imaging bean showing the display of information for a data imaging set including master, shadow, bitmap and overflow volumes.

FIG. 9 is a screen shot of an illustrative screen display 900 generated by an HTML form that could be used with the data imaging system of the present invention. This form includes information for viewing and controlling data imaging volume sets. It includes an option button set 902 that can be used to select the set type: either independent of dependent and a textbox 912 that can be used to enter the set name.

Further text boxes are provided for entering the pathname 904 of the master volume and displaying its capacity 914, for entering the pathname 906 of the shadow volume and displaying its capacity 916. Textboxes are also provided for entering the pathname 908 of the bitmap volume of the set and displaying its capacity 918. Finally, textboxes are provided for entering the pathname 910 of the overflow volume (if any) assigned to the set and displaying its capacity 920.

Information for a new IISet can be entered into the appropriate text boxes and then saved by selecting the "OK" command button 922. Alternatively, information displayed on the form can be modified and the modifications saved by selecting the "Apply" command button 924. Any new information or changes can be canceled by selecting the "Cancel" command button 926.

Figure 10:
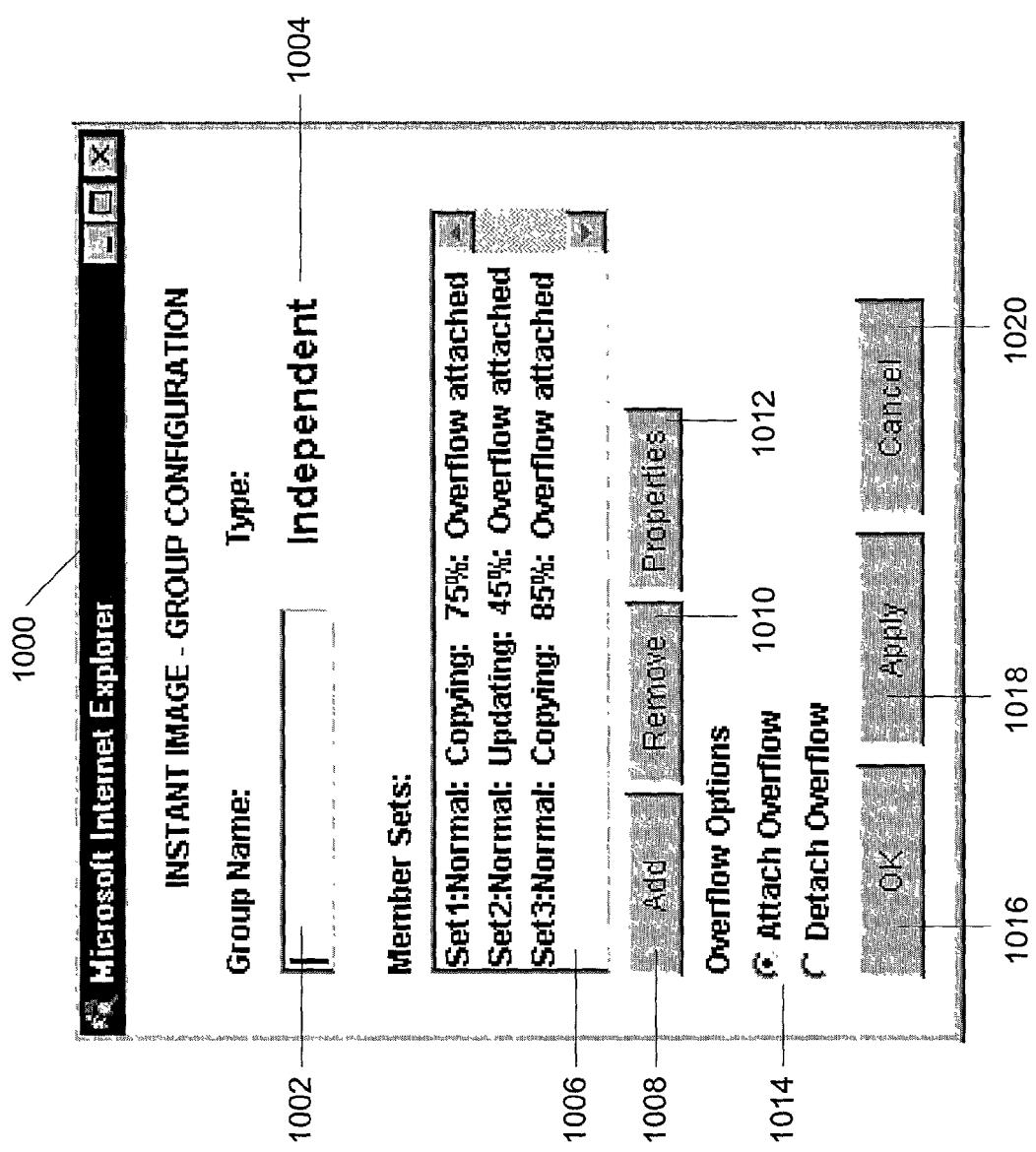
FIG. 10 is a screen shot of a screen display generated by a graphic user interface showing a dialog box display for configuring data imaging groups.

FIG. 10 is a screen shot of an illustrative screen display 1000 generated by an HTML form that could be used with the data imaging system of the present invention. This form includes information for viewing and controlling data imaging volume groups. It includes a textbox 1002 for entering a name for the IIGroup. The type of the group is also displayed at label 1004. A list box 1006 is provided for displaying each IISet in the group and its properties and status. As illustrated, information for each IISet is displayed on a row in the list box and includes the set name, the set state, the current operational status, the percent completed and whether an overflow volume is attached to the set.

Command buttons are provided to add 1008, remove 1010 and change the properties 1012 of a set selected in the list box 1006. Selecting one of these buttons, 1008–1012, would typically open additional dialog boxes (not shown) as appropriate. An overflow volume option group 1014 is provided to attach an overflow volume to a selected set as desired.

Information for a new IIGroup can be entered into the appropriate text boxes and then saved by selecting the "OK" command button 1016. Alternatively, information displayed on the form can be modified and the modifications saved by selecting the "Apply" command button 1018. Any new information or changes can be canceled by selecting the "Cancel" command button 1020.

Figure 11:
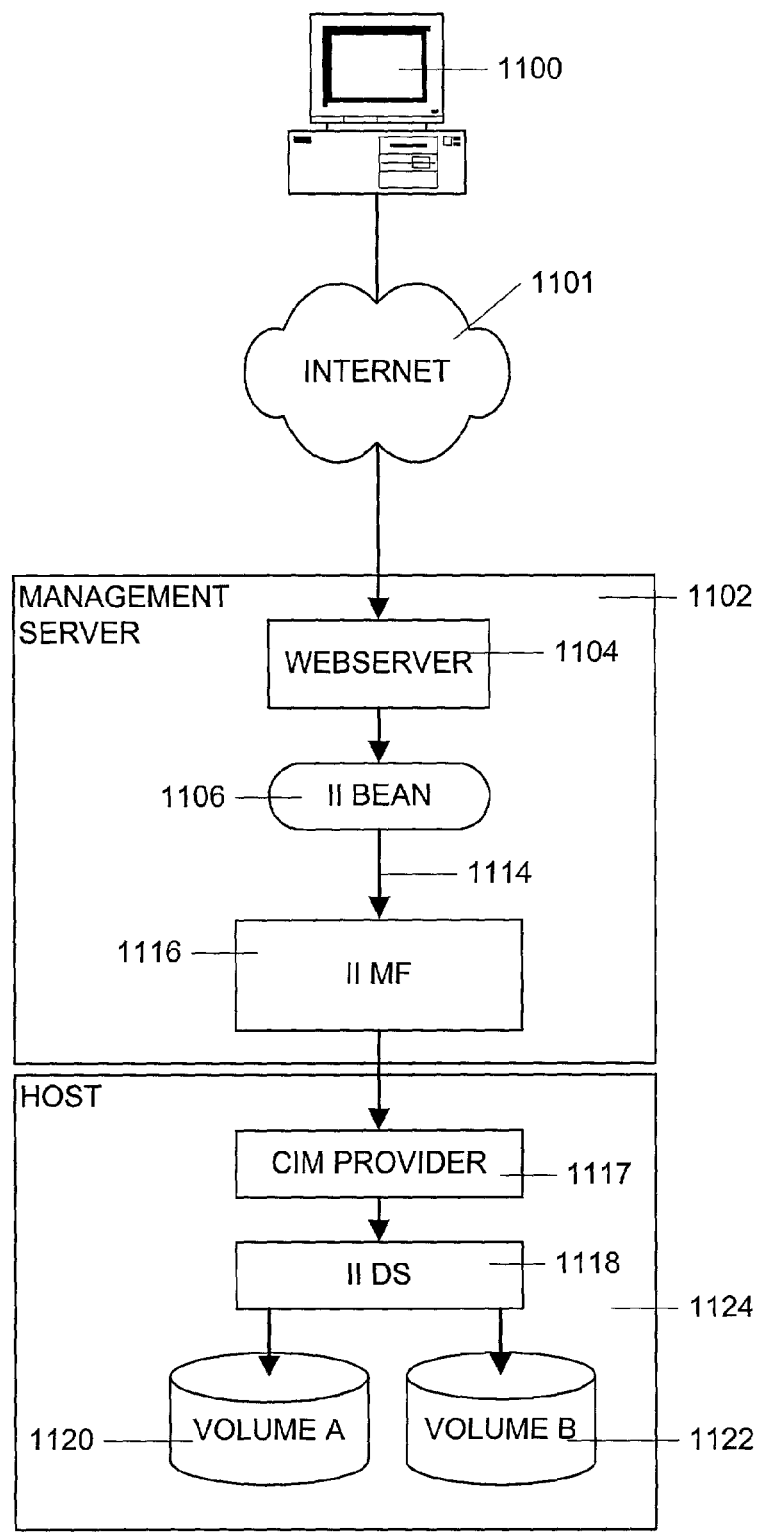
FIG. 11 is a schematic block diagram illustrating the implementation of a simple data imaging system using the principles of the present invention.
Figure 12A:
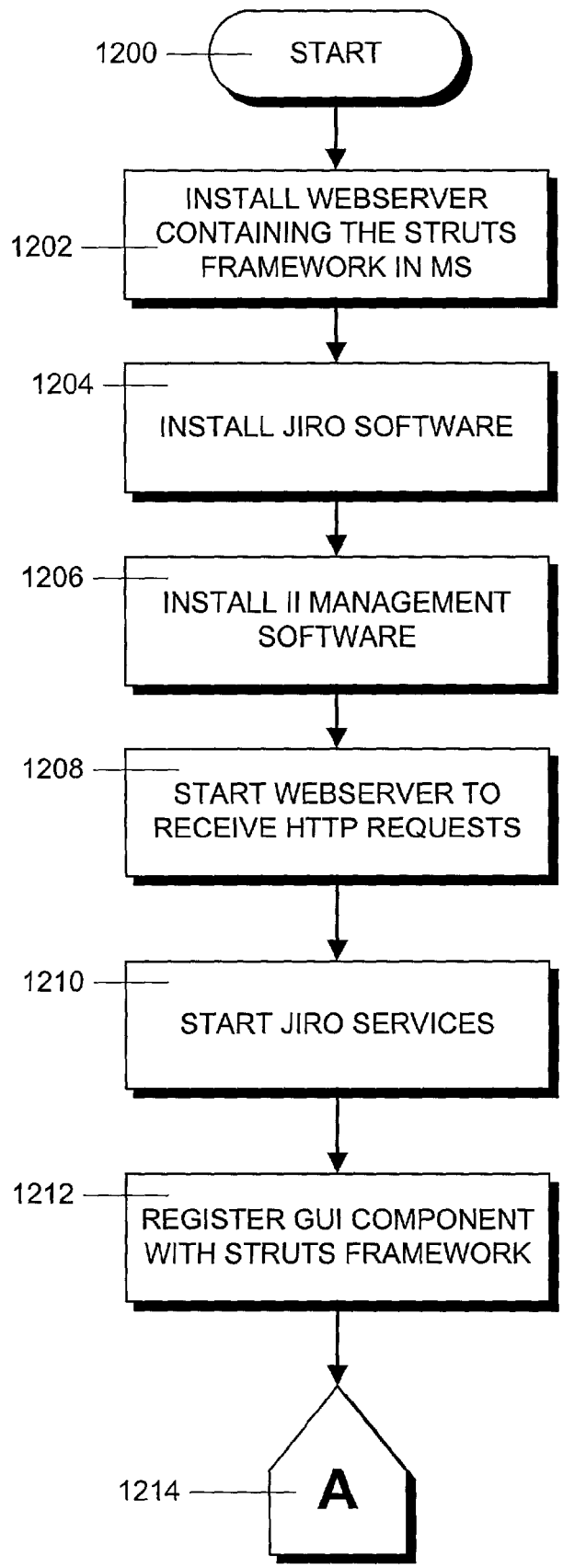
FIGS. 12A and 12B, when placed together, form a flowchart showing the steps of an illustrative process for installing data imaging software in the system of FIG. 11.
Figure 12B:
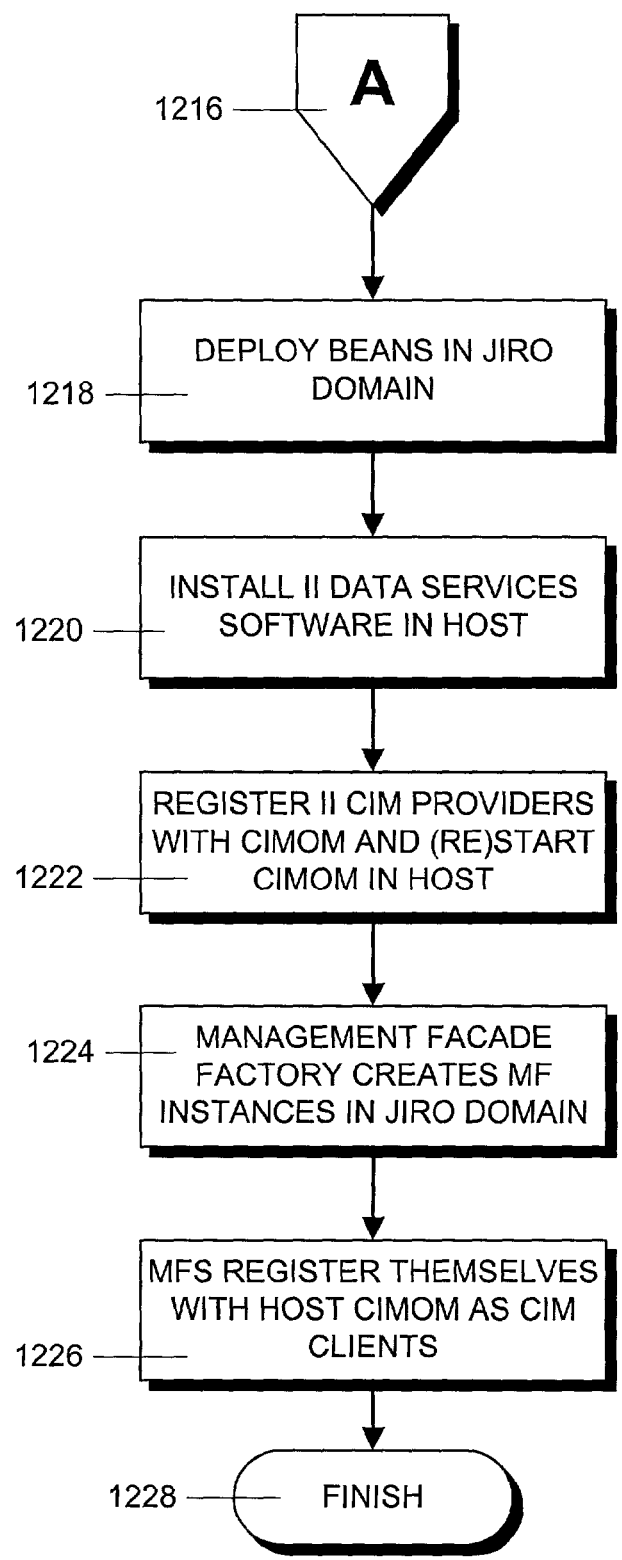
Figure 13A:
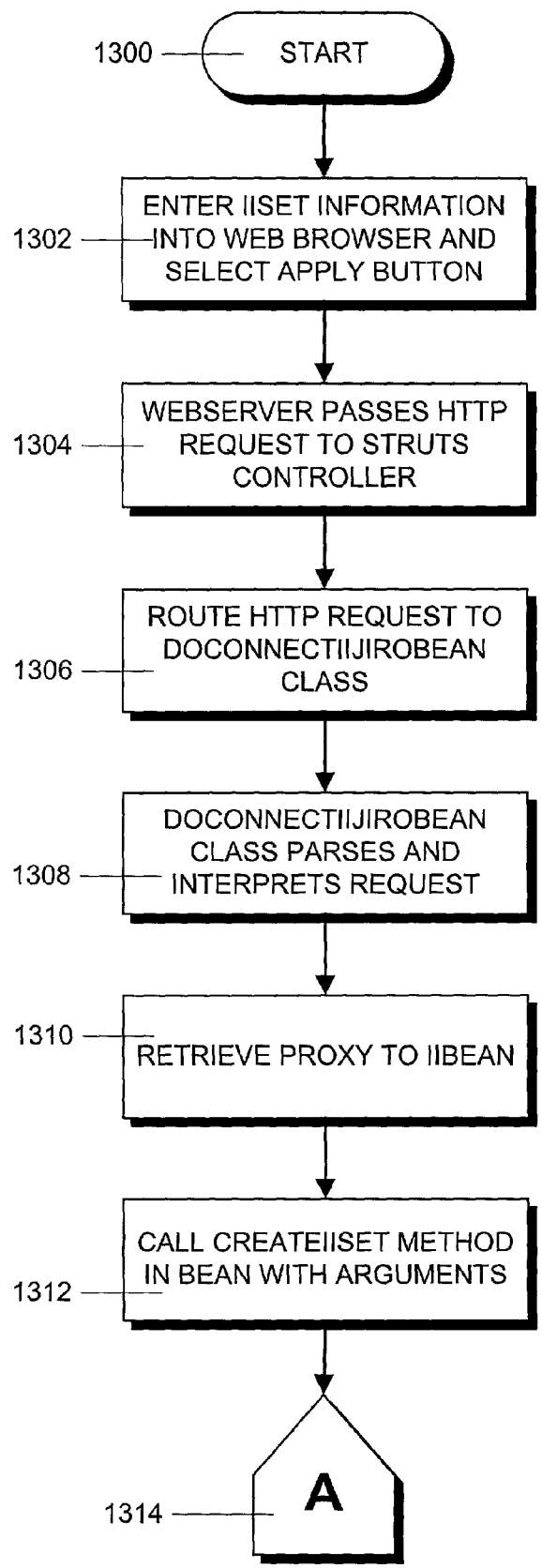
FIGS. 13A–13C, when placed together, form a flowchart showing the steps of an illustrative process for creating an IISet in the system of FIG. 11.
Figure 13B:
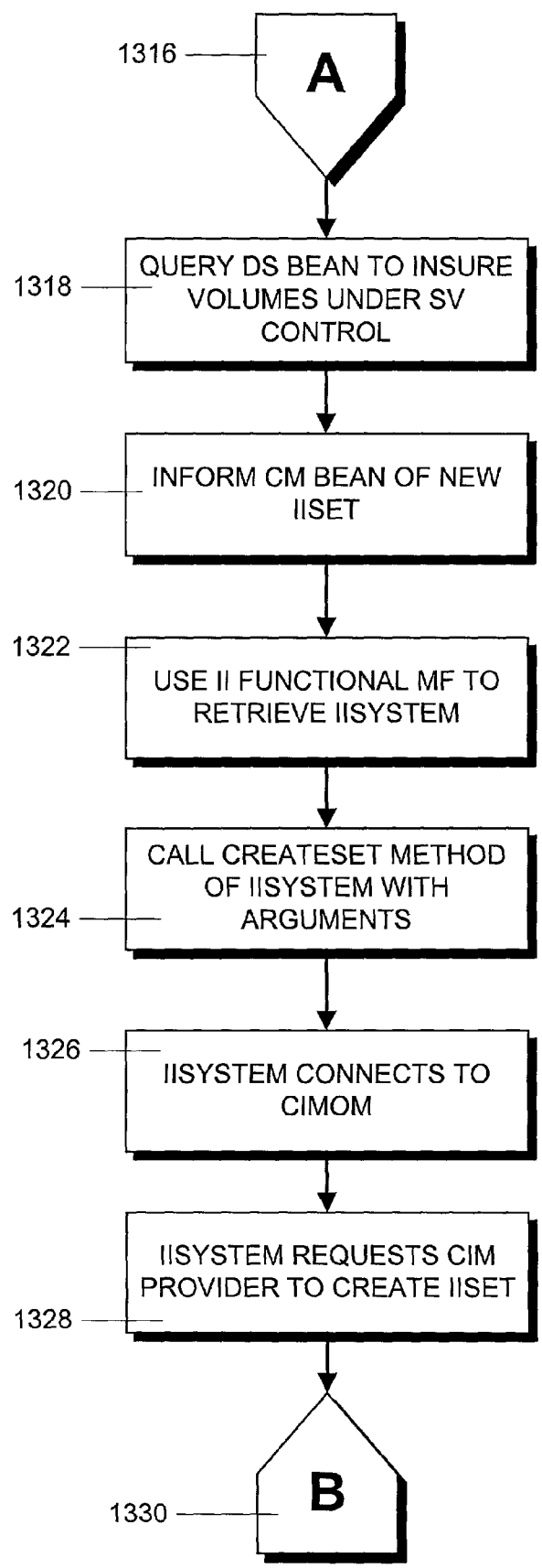
Figure 13C:
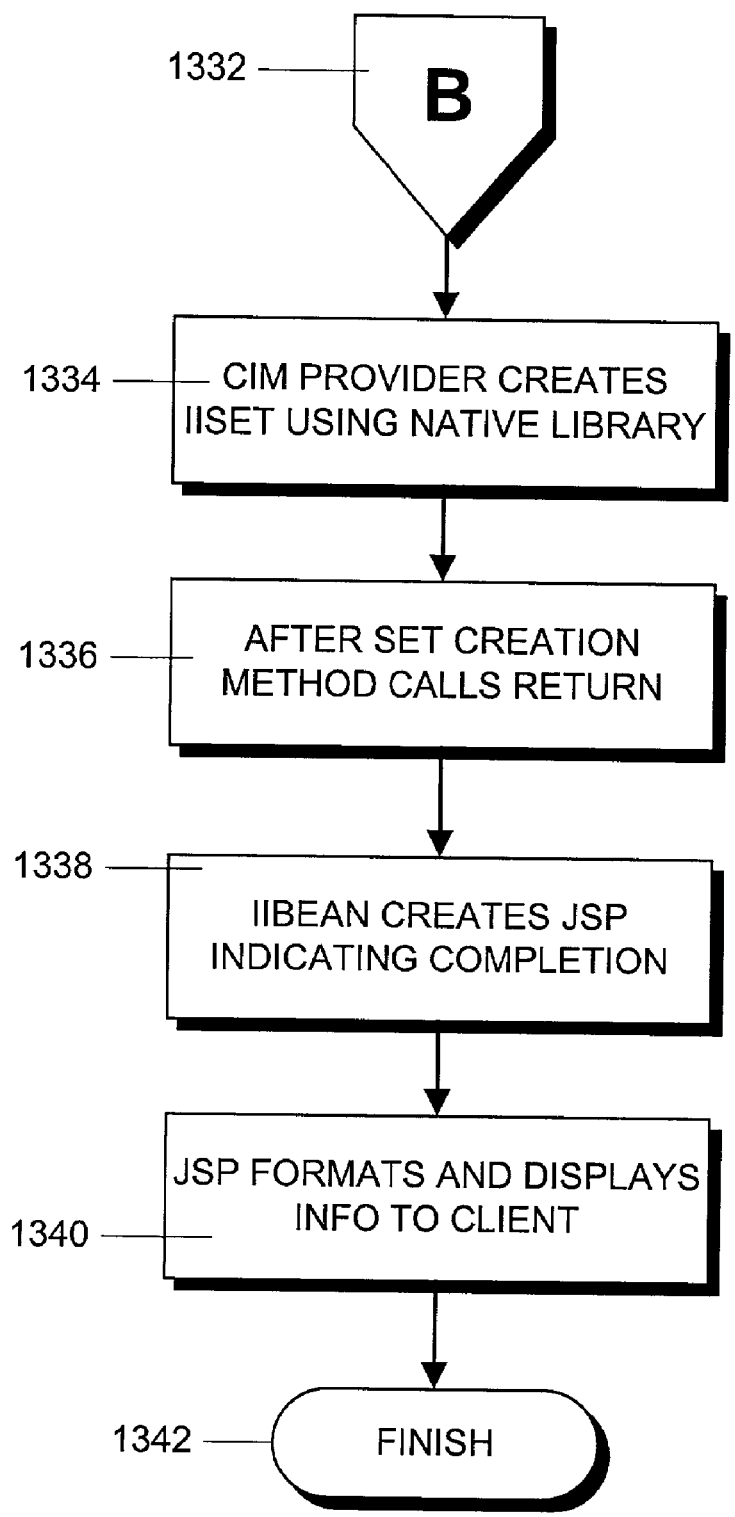

An example data imaging system setup is illustrated in FIG. 11. FIGS. 12A and 12B illustrate the steps performed in initially configuring the system. FIGS. 13A–13C show a flowchart illustrating the steps carried out by the inventive data imaging system to create an IISet in the configuration shown in FIG. 11.

In order to use the inventive system, the software that is required must first be installed in the system, including the management server system 1102 and the host system 1124. Note that in FIG. 11, the management server system 1102 is illustrated as a different system from the host system 1124. However, the inventive data imaging system can also operate with a configuration in which the management server and the host are on the same computer system. The steps of the installation process are shown in FIGS. 12A and 12B. The installation process begins in step 1200 and proceeds to step 1202 where a webserver 1104 containing the STRUTS framework (if that framework is to be used to process the request) is installed in the management server 1102 and, in step 1204, the Jiro™ software is installed in the management server 1102. The installation process for this software is explained in detail in the aforementioned Jiro SDK.

In step 1206, the 11 management software is installed in the management server system 1102. This software includes the management facade factory 428 (FIG. 4) and the federated beans 1106 (comprising the IIBean 434 and other beans that are necessary, such as the DSV bean 432 and the configuration manager bean 436).

In step 1208, the webserver 1104 is started so that it can receive http requests via the Internet 1101 from a GUI component, such as a web browser, in terminal 1100. In step 1210 the Jiro services software is started and, in step 1212, the GUI component in terminal 1100 is registered with the STRUTS framework in the webserver 1104.

The installation routine then proceeds, via off-page connectors 1214 and 1216, to step 1218. In step 1218, the data imaging and other federated beans are deployed in the Jiro domain.

Next, the data services software used for instant imaging is installed on the host system 1124. This software 1118 includes the data service layer software 252 (FIG. 2), the data imaging layer 254 and the native interfaces, 242 and 246. Other layers, such as a data-caching layer can also be included in this installation process. In general, the CIM object manager instance 230 would be part of the operating system on the host and would not need to be separately installed. The managed object format files that are used to create the CIM providers would also have been previously installed.

In order to create instances of the CIM provider 1117, the MOF files must be registered with the CIMOM. This is shown in step 1222 where the MOF files are registered with the CIMOM (not shown in FIG. 11) in the host 1124 and the CIMOM is restarted, if it is already running, or started, if it is not already running. When the CIMOM is restarted, it creates instances of the required CIM providers in accordance with the MOF files as previously described. During this process, appropriate creation events are generated by the CIMOM.

In response to the creation events generated by the CIMOM, the management facade factory 428 creates instances on the corresponding management facades in the appropriate Jiro™ domain as set forth in step 1224.

Next, in step 1226, the management facades register themselves with the host CIMOM as CIM clients. The process then finishes in step 1228.

After the installation and deployment steps are complete in host 1124, the process of establishing a volume set and, subsequently, making a point-in-time backup of master Volume A 1120 to shadow Volume B 1122 can begin. The steps involved in creating an IISet are illustrated in FIGS. 13A–13C.

The configuration process begins in step 1300 and proceeds to step 1302 where, from terminal 1100, a system manager uses a GUI generated by a web browser, such as that shown in FIG. 9, to configure an IISet by entering the set information, including the set name, set type (independent or dependent) and the master volume, shadow volume bitmap volume and overflow volume names. The manager then selects the "Apply" command button that, in turn, causes the web browser to generate an http request and to send the request, via the Internet 1101, to the webserver 1104.

As set forth in step 1304, the http request is received by the webserver 1104 that passes the request to the STRUTS controller. In step 1306, the STRUTS 10 controller routes the request to the DoConnectIIJiroBean class.

Next, in step 1308, the DoConnectIIJiroBean class parses and interprets information in the request, such as the host, volume and bitmap names that were submitted by the client. Once the parsing and interpretation is complete, in step 1310, the class uses the Jiro lookup service to get a handle (proxy) of the IIBean that is managing data imaging services on that host.

In step 1312, once the DoConnectIIJiroBean class locates the appropriate IIBean and retrieves the proxy to the IIBean, it sends the IISet information as arguments, via the proxy, to the IIBean by invoking the createIISet( ) method in the IIBean. The process then proceeds, via off-page connectors 1314 and 1316, to step 1318, where the IIBean then creates a proxy to a new IISet. Creation of this new proxy causes several steps to happen. First, in step 1318, the data service volume bean (432, FIG. 4) is queried to verify that the volumes being made part of the new IISet are under the control of the SV layer.

Next, in step 1320, the configuration manager bean 436 is informed of the new IISet. In step 1322, the IIBean uses the Jiro™ lookup service to locate a proxy to the imaging functional interface, IIFuncMF (602, FIG. 6). The IIFuncMF interface is, in turn, used to locate the IISystem management facade 606. The IIsystem management facade is instructed to perform the create operation by invoking the createIISet( ) method on its proxy with the arguments provided by the client (step 1324.)

In step 1326, in response to the invocation of the createIISet( ) method, the IISystem management facade becomes a client of the CIMOM in the host 1124 by connecting to it (step 1326). It then requests that a CIM provider registered with the CIMOM 1117 create an instance of the IISet (step 1328.) The process then proceeds, via off-page connectors 1330 and 1332, to step 1334.

In step 1334, the CIM provider creates the IISet by using the appropriate native interface to set up the data structures necessary for enabling the set within the host computer kernel. If this operation is successful, the various method calls return (step 1336) to indicate the successful creation of the IISet.

In response to the return from the method calls, the IIBean creates a JSP in step 1338 and the information that the bean returns is formatted and displayed to the client by the JSP as set forth in step 1340. The process then finishes in step 1342.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

The invention claimed is:

1. A method for managing a data imaging service in a distributed computer system having a host computer with at least one storage device connected to the host computer by driver software, the method comprising:
   (a) inserting an interface layer between the driver software and the storage device, the interface layer exporting a platform dependent API and controlling data passing between the driver software and the storage device;
   (b) running, in the host computer, a CIM object manager containing a CIM provider that can make calls on the platform dependent API;
   (c) running, in a management server, management facade software including a CIM client that can contact the CIM provider to control the CIM provider;
   (d) running, in the management server, a federated bean that generates method calls to the management facade software to control the interface layer; and
   (e) controlling the federated bean to designate master volumes, shadow volumes and bitmap volumes and to transfer data between specified master and shadow volumes.

2. The method of claim 1 wherein step (e) comprises controlling the federated bean with a graphical user interface.

3. The method of claim 2 wherein step (e) further comprises placing the graphical user interface in a location other than the host computer and the management server.

4. The method of claim 3 wherein step (e) further comprises using a lookup service in the distributed computer system to locate the federated bean and obtain a proxy thereto.

5. The method of claim 4 wherein step (e) further comprises using the proxy in the graphic user interface to control the federated bean.

6. The method of claim 1 wherein step (e) comprises:
   (e1) creating a volume set;
   (e2) designating a master volume, a shadow volume and a bitmap volume as part of the volume set; and
   (e3) performing data imaging operations on the volume set.

7. The method of claim 6 wherein a plurality of volume sets are created and wherein the method further comprises:
   (f) creating a set group;
   (g) adding selected volume sets to the set group; and
   (h) controlling the set group with a single command to perform data imaging operations on each set in the set group.

8. The method of claim 6 further comprising attaching an overflow volume to the volume set.

9. The method of claim 6 wherein the computer system has a first host computer with a volume set thereon and a second host computer and the method comprises exporting a shadow volume in the volume set from the first host computer.

10. The method of claim 9 further comprising importing the shadow volume exported by the first host computer into the second host computer.

11. The method of claim 1 wherein step (b) comprises using the CIM object manager to instantiate a CIM provider object based on a managed object file.

12. The method of claim 11 wherein step (c) comprises using a management facade factory to create a management facade object when a CIM provider object is instantiated.

13. Apparatus for managing a data imaging service in a distributed computer system having a host computer with at least one storage device connected to the host computer by driver software, the apparatus comprising:
   an interface layer located between the driver software and the storage device, the interface layer exporting a platform dependent API and controlling data passing between the driver software and the storage device;

a CIM object manager running in the host computer, the CIM object manager containing a CIM provider that can make calls on the platform dependent API;

management facade software running in a management server, the management facade software including a CIM client that can contact the CIM provider to control the CIM provider;

a federated bean running in the management server, the federated bean generating method calls to the management facade software to control the interface layer; and means for controlling the federated bean to designate master volumes, shadow volumes and bitmap volumes and to transfer data between specified master and shadow volumes.

14. The apparatus of claim 13 wherein the means for controlling the federated bean comprises a graphical user interface.

15. The apparatus of claim 14 wherein the distributed computer system includes a network and wherein the means for controlling the federated bean further comprises means for connecting the graphical user interface to the federated bean over the network.

16. The apparatus of claim 15 wherein the distributed computer system comprises a lookup service and wherein the means for controlling the federated bean comprises means for using the lookup service to locate the federated bean and obtain a proxy thereto.

17. The apparatus of claim 16 wherein the means for controlling the federated bean comprises means for using the proxy to control the federated bean.

18. The apparatus of claim 13 wherein the means for controlling the federated bean comprises:

means for creating a volume set;

means for designating a master volume, a shadow volume and a bitmap volume as part of the volume set; and means for performing data imaging operations on the volume set.

19. The apparatus of claim 18 wherein a plurality of volume sets are created and wherein the apparatus further comprises:

means for creating a set group;

means for adding selected volume sets to the set group; and means for controlling the set group with a single command to perform data imaging operations on each set in the set group.

20. The apparatus of claim 18 further comprising means for attaching an overflow volume to the volume set.

21. The apparatus of claim 18 wherein the computer system has a first host computer with a volume set thereon and a second host computer and the apparatus comprises means for exporting a shadow volume in the volume set from the first host computer.

22. The apparatus of claim 21 further comprising means for importing the shadow volume exported by the first host computer into the second host computer.

23. The apparatus of claim 13 wherein the CIM object manager comprises means for instantiating a CIM provider object based on a managed object file.

24. The apparatus of claim 23 further comprising a management facade factory that creates a management facade object when a CIM provider object is instantiated.

25. A computer program product for managing a data imaging service in a distributed computer system having a host computer with at least one storage device connected to the host computer by driver software, the computer program product comprising a tangible computer usable medium having computer readable program code thereon, including:

interface layer software inserted between the driver software and the storage device, the interface layer software exporting a platform dependent API and controlling data passing between the driver software and the storage device;

CIM object manager software operable in the host computer containing means for creating a CIM provider that can make calls on the platform dependent API;

management facade software operable in a management server including a CIM client that can contact the CIM provider to control the CIM provider;

federated bean software operable in the management server, the federated bean software generating method calls to the management facade software to control the interface layer; and program code for controlling the federated bean to designate master volumes, shadow volumes and bitmap volumes and to transfer data between specified master and shadow volumes.

26. The computer program product of claim 25 wherein the program code for controlling the federated bean comprises graphical user interface program code.

27. The computer program product of claim 26 wherein the program code for controlling the federated bean further comprises program code for using a lookup service in the distributed computer system to locate the federated bean and obtain a proxy thereto.

28. The computer program product of claim 27 wherein the program code for controlling the federated bean further comprises program code for using the proxy in the graphic user interface to control the federated bean.

29. A computer readable medium that includes software instructions for managing a data imaging service in a distributed computer system having a host computer with at least one storage device connected to the computer system by driver software, the software instructions comprising:

interface layer software for insertion between the driver software and the storage device, the interface layer software exporting a platform dependent API and controlling data passing between the driver software and the storage device;

CIM object manager software operable in the host computer containing means for creating a CIM provider that can make calls on the platform dependent API;

management facade software operable in a management server including a CIM client that can contact the CIM provider to control the CIM provider;

federated bean software operable in the management server, the federated bean software generating method calls to the management facade software to control the interface layer; and program code for controlling the federated bean to designate master volumes, shadow volumes and bitmap volumes and to transfer data between specified master and shadow volumes.

* * * * *